United States Patent
Arai

(10) Patent No.: US 6,642,959 B1
(45) Date of Patent: Nov. 4, 2003

(54) ELECTRONIC CAMERA HAVING PICTURE DATA OUTPUT FUNCTION

(75) Inventor: Tatsuo Arai, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/098,065

(22) Filed: Jun. 16, 1998

(30) Foreign Application Priority Data

Jun. 30, 1997 (JP) .............................. 9-188984

(51) Int. Cl.[7] .......................... H04N 5/76; H04N 5/225; H04N 5/232
(52) U.S. Cl. ............................. 348/231.3; 348/207.1; 348/211.3
(58) Field of Search ................................ 348/239, 552, 348/143, 211.2, 231.2, 231.3, 231.99, 211.99, 207.1, 207.11, 207.2, 211.6, 211.11, 211.12, 231.9; 710/62

(56) References Cited

U.S. PATENT DOCUMENTS

| | | | | |
|---|---|---|---|---|
| 5,335,072 A | * | 8/1994 | Tanaka et al. ............... | 348/232 |
| 5,502,486 A | * | 3/1996 | Ueda et al. .................. | 348/239 |
| 5,806,005 A | * | 9/1998 | Hull et al. ............... | 348/14.12 |
| 5,826,269 A | * | 10/1998 | Hussey ......................... | 703/27 |
| 5,870,207 A | | 2/1999 | Kamimoto et al. | |
| 5,881,233 A | * | 3/1999 | Toyoda et al. .............. | 709/233 |
| 5,943,603 A | * | 8/1999 | Parulski et al. ............. | 348/552 |
| 6,023,292 A | | 2/2000 | Wakui | |
| 6,147,708 A | * | 11/2000 | Suzuki et al. ................ | 348/232 |
| 6,163,344 A | * | 12/2000 | Kawamura et al. ...... | 348/220.1 |
| 6,167,469 A | * | 12/2000 | Safai et al. .................... | 710/62 |
| 6,188,431 B1 | * | 2/2001 | Oie ............................ | 348/211 |
| 6,195,126 B1 | * | 2/2001 | Kikuchi et al. ............. | 348/232 |
| 6,337,900 B2 | * | 1/2002 | Toyoda et al. ......... | 379/100.08 |
| 2001/0010543 A1 | * | 8/2001 | Ward et al. .................. | 348/232 |
| 2001/0019359 A1 | * | 9/2001 | Parulski et al. ............. | 348/207 |

FOREIGN PATENT DOCUMENTS

| | | | | |
|---|---|---|---|---|
| JP | 5-204795 | 8/1993 | | |
| JP | 5-236420 | 9/1993 | | |
| JP | 7-152674 | 6/1995 | | |
| JP | 08102837 A | * 4/1996 | ............ | H04N/1/32 |
| JP | 8-223341 | 8/1996 | | |
| JP | 9-102901 | 4/1997 | | |
| JP | 9-130726 | 5/1997 | | |

\* cited by examiner

*Primary Examiner*—Wendy R. Garber
*Assistant Examiner*—John M. Villecco
(74) *Attorney, Agent, or Firm*—Frishauf, Holtz, Goodman & Chick, P.C.

(57) ABSTRACT

A digital camera stores captured picture data and E-mail address data inputted from a key entry unit in a flash memory so that they are associated with each other and then transfers the picture data and the E-mail address data to a personal computer via an I/O port or an infrared communication unit. The personal computer receives the picture data and the E-mail address data transferred from the digital camera via an I/O port or an infrared communication unit. The received picture data is then transmitted to a destination terminal on a computer network on the basis of the received E-mail address data.

37 Claims, 20 Drawing Sheets

FIG.4

CHARACTER DATA STORAGE TABLE

SHIFT DIRECTION BY (+) KEY OPERATION →

SHIFT DIRECTION BY (−) KEY OPERATION ↓

| | X1 | X2 | X3 | X4 | X6 | X7 | X8 | X9 | X10 | X11 |
|---|---|---|---|---|---|---|---|---|---|---|
| Y1 | あ | い | う | え | お | a | b | c | d | e |
| Y2 | か | き | く | け | こ | f | g | h | i | j |
| Y3 | さ | し | す | せ | そ | k | l | m | n | o |
| Y4 | た | ち | つ | て | と | p | q | r | s | t |
| Y5 | な | に | ぬ | ね | の | u | v | w | x | y |
| Y6 | は | ひ | ふ | へ | ほ | z | : | ; | . | ~ |
| Y7 | ま | み | む | め | も | @ | / | — | ? | ! |
| Y8 | や | ( | ゆ | ) | よ | ゃ | ゅ | ょ | っ | ¥ |
| Y9 | ら | り | る | れ | ろ | 1 | 2 | 3 | 4 | 5 |
| Y10 | わ | を | ん | ゛ | ゜ | 6 | 7 | 8 | 9 | 0 |

~34a

鈴木 花子
hanaco-suzuki@○○○.co.or.jp 18
12

ELECTRONIC CAMERA HAVING PICTURE DATA OUTPUT FUNCTION

BACKGROUND OF THE INVENTION

This application is based on Japanese Patent Application No. 9-188984 filed on Jun. 30, 1997, the contents of which is incorporated herein by reference.

The present invention relates to an electronic camera, an electronic device, a transmission system, and a control method therefor. In particular, the present invention is suitably applied to an electronic mail system, but other applications are also possible.

Conventionally, there are electronic cameras, such as digital cameras (electronic still cameras) and the like, which are adapted to transfer picture data to personal computers or work stations.

In addition, electronic mail (hereinafter abbreviated to E-mail) is known as a system which permits personal computers or work stations to communicate text, audio, and picture data with each other over a computer network.

With the E-mail service, in order to send mail from a terminal, it is required to set the E-mail address of the location to which data is to be sent.

Conventionally, in setting the destination address on the terminal side, an address file, in which E-mail address data is stored associated with name data or items to be retrieved, is opened and the desired E-mail address data is specified. As an alternative, the E-mail address data is keyed in.

However, such a conventional address setting feature poses the following problems.

That is, since the E-mail address data consists of a relatively long character string that is made up by alphabetic characters, numerals, and symbols, the desired address data is difficult to find in the address book and much time is required to select and specify it. For keying in address data, key operations are troublesome and entry mistakes are easy to occur. Thus, difficulties are also involved in transferring picture data taken by a digital camera to a personal computer and then transmitting the picture data from the personal computer to a destination terminal by E-mail.

It is therefore an object of the present invention to provide an electronic camera, an electronic device, a transmission system, and a control method, which permit picture data taken by the electronic camera to be transmitted to a destination terminal with ease and certainty.

BRIEF SUMMARY OF THE INVENTION

According to an aspect of the present invention there is provided an electronic camera comprising: picture capturing means for capturing a picture of a subject; input means for inputting the destination address of a location to which picture data captured by the picture capturing means is to be transmitted; storage means for storing the picture data captured by the picture capturing means and the destination address data input by the input means so that they are associated with each other; and output means for externally outputting the picture data and its associated destination address stored in the storage means.

This arrangement allows the user to transmit a picture captured by the electronic camera to a desired destination terminal with ease and certainty.

According to another aspect of the present invention there is provided an electronic device comprising: receive means for receiving picture data and its associated destination address data indicating a destination terminal to which the picture data is to be transmitted; storage means for storing the picture data and its associated destination address data received by the receive means; and transmit means for transmitting the picture data stored in the storage means to the destination terminal on the basis of the destination address data stored in the storage means.

This arrangement allows the user to transmit a picture captured by the electronic camera to a desired destination terminal with ease and certainty.

According to still another aspect of the present invention there is provided a transmission system composed of an electronic camera and an electronic device in which the electronic camera comprises: picture capturing means for capturing a picture of a subject; input means for inputting the destination address data of a location to which picture data captured by the picture capturing means is to be transmitted; first storage means for storing the picture data captured by the picture capturing means and the destination address data input by the input means so that they are associated with each other; and output means for externally outputting the picture data and its associated destination address data stored in the first storage means, and the electronic device comprises: receive means for receiving picture data and its associated destination address data indicating a destination terminal to which the picture data is to be transmitted; second storage means for storing the picture data and its associated destination address data received by the receive means; and transmit means for transmitting the picture data stored in the second storage means to the destination terminal on the basis of the destination address data stored in the second storage means.

This arrangement also allows the user to transmit a picture captured by the electronic camera to a desired destination terminal with ease and certainty.

Additional objects and advantages of the invention will be set forth in the description which follows, and in part will be obvious from the description, or may be advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows an example of a character data storage table developed in the RAM of FIG. 2;

DETAILED DESCRIPTION OF THE INVENTION

Figure 1:
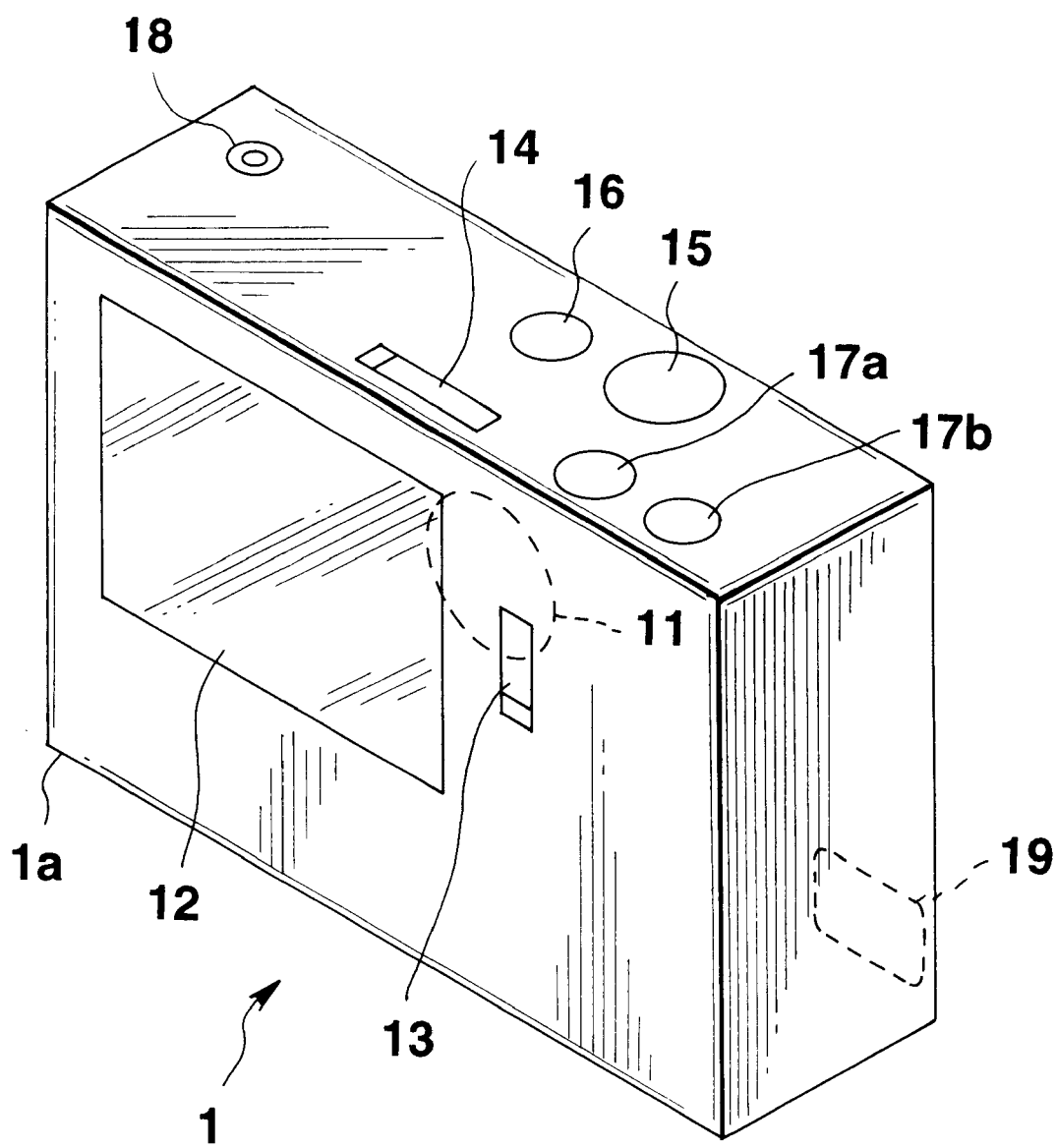
FIG. 1 is a perspective exterior view of a digital camera to which the present invention is applied.

FIG. 1 illustrates a perspective exterior view of a digital camera to which the present invention is applied. The digital camera, indicated generally at 1, is equipped with a picture-taking lens 11 (indicated dotted) on the front side of its body 1a. The front side of the camera body is hidden in the figure. A display unit 12, such as a liquid crystal display, is disposed on the back side of the body 1a. The display unit can display a subject picture being shot through the picture-taking lens 11 at the time of shooting or can reproduce a picture already captured. On the right-hand side of the display unit mounted is a mode changeover switch 13 which is slidable up and down to set the camera to the shooting mode, reproduce mode, communication mode, or data entry mode.

On the top of the camera body are provided a power switch 14 which is slidable right and left, a shutter key 15 for shooting a picture and determining an item selected in each mode, an effect key 16 for canceling an item selected in each mode, and a plus (+) key 17a and a minus (-) key 17b for selecting an item of picture data to be displayed from among a plurality of items of picture data stored in a memory (a flash memory 32 to be described later) and selecting set conditions in each mode.

On the top of the body 1a is further disposed a serial input/output terminal 18 for sending or receiving picture data and control data to or from external equipment (in this embodiment, a personal computer 2 as will be described later) over a communication cable (not shown). In addition, at the front of the body is provided an infrared-transmitter/detector window 19 (indicated dotted) for transmitting or receiving picture data and control data to or from external equipment via infrared signals. An example of the communication cable connectable to the serial input/output terminal 18 is an RS-232C (serial type) cable.

The digital camera 1 may be composed of a camera unit equipped with a picture-taking lens and a body unit and designed such that the camera unit is mounted to the body unit rotatably or removably. With such a design, the camera unit could be rotated through various angles with respect to the body unit or used separate from the body unit.

Next, a circuit arrangement of the digital camera 1 shown in FIG. 1 will be described with reference to FIG. 2.

As shown, the digital camera comprises the display unit 12 shown in FIG. 1, a charge coupled device (CCD) 20, an amplifier 21, an analog-to-digital (A/D) converter 22, a driver circuit 23, a timing generator 24, a signal generator 25, a video random access memory (VRAM) 26, a digital-to-analog (D/A) converter 27, an amplifier 28, a dynamic random access memory (DRAM) 29, a compression/decompression circuit 30, a flash memory 31, a CG (Character Generator) 32, a ROM (Read Only Memory) 33, a RAM (Random Access Memory) 34, a key entry unit 35, a CPU 36, an input/output (I/O) port 37, and an infrared communication unit 38.

The CCD 20 is composed of a two-dimensional array of pixels each consisting of a photosensitive element, such as a photodiode, and a transfer electrode disposed above the photosensitive element and an output unit that converts the amount of charge stored on each pixel into a voltage signal. Incoming light is directed onto the pixel array through the lens 11, so that each pixel stores an amount of charge proportional to the amount of light incident on it. The charge stored on each pixel is read out in sequence as a camera-taken signal (analog signal) by the output unit responsive to a drive signal generated from the driver circuit 23. The analog signal is amplified by the amplifier 21 and then applied to the A/D converter 22.

The A/D converter 22 converts the picture signal of analog form supplied from the CCD 20 through the amplifier 21 into a digital signal, which is in turn applied to the timing generator 24.

The driver circuit 23 is responsive to timing signals generated from the timing generator 24 to control the exposure and readout timing of the CCD 20. The timing generator 24 is responsive to a picture capturing signal from the CPU 36 to generate timing signals for controlling the driver circuit 23.

The signal generator 25 performs color operations on the camera-taken signal (digital signal) supplied via the timing generator 24 to produce picture data formed from a brightness signal (Y data) and color signals (C signals). The resulting picture data is output to the RAM 29. The signal generator 25 adds sync signals to picture data supplied from the DRAM 29 by the CPU 36 to produce a video signal (digital signal). The video signal is temporarily stored into the VRAM 26, then output to the display unit 12 via the D/A converter 27 and the amplifier 28.

The VRAM 26 is a video memory that temporarily stores a video signal (display data) produced by the signal generator 25.

The D/A converter 27 converts the video signal (display data) from the VRAM 26 into an analog signal which, in turn, is applied to the display unit 12 via the amplifier 28.

The display unit 12, which consists of a liquid crystal display, displays a picture on its display screen on the basis of the video signal inputted via the D/A converter 27 and the amplifier 28.

The DRAM 29 is a semiconductor memory that temporarily stores the picture data supplied from the signal generator 25 or picture data read from the flash memory 31 by the CPU 36 and subjected to decompression in the compression/decompression circuit 30 to be described later.

The compression/decompression circuit 30 subjects the picture data stored in the DRAM 29 to compressed coding. Specifically, the compression/decompression circuit compresses (encodes) picture data in accordance with a predetermined encoding scheme which depends on the type of picture to be treated (in this case, a still picture), for example, DCT (Discrete Cosine Transform) for each array of 8×8 pixels according to the JPEG (Joint Photographic Experts Group) algorithm, quantization, or Huffman encoding. The resulting compressed picture data is stored in the flash memory 31. Also, the compression/decompression circuit 30 decompresses the compressed picture data stored in the flash memory 31 and then outputs the resulting picture data to the DRAM 29.

The flash memory 31 is a semiconductor memory that stores a plurality of items of picture data compressed by the compression/decompression circuit 30.

Figure 3:
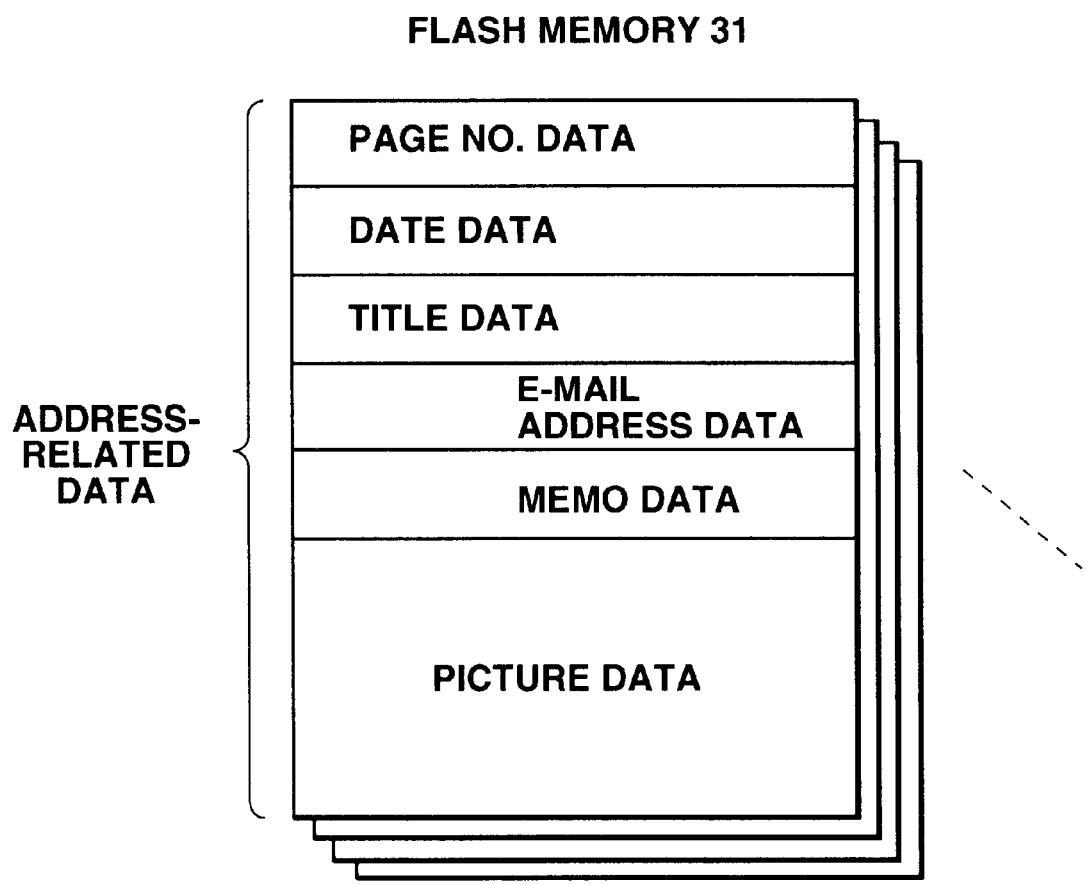
FIG. 3 shows a memory map of the flash memory of FIG. 2.

FIG. 3 shows a memory organization of the flash memory 31. As shown, the flash memory stores a plurality of items of picture data each having page number (No.) data, date data, title data, E-mail address data, and memo data associated with.

The page number data is numeric data indicating the order of storage allocated to each of the items of picture data in the order in which they are stored. For example, picture data that is stored first in the flash memory is assigned page number data "1", and picture data stored next is assigned page number data "2".

The date data indicates the date and time when picture data was captured. The title data indicates the title of picture data (for example, "Opening Ceremony at School", "In Kyoto") or the title of a transmit E-mail message.

The E-mail address data is destination address data indicating the address of a terminal, such as a personal computer connectable to a computer network, to which an E-mail message is sent from a certain terminal over the computer network. The memo data indicates a memo for picture data or a person to which a message is sent.

The date data, title data, E-mail address data and memo data are entered by the user at the time of data entry procedure (see FIGS. 8 and 9) to be described later and stored into the flash memory 31 so that they are associated with corresponding picture data.

Returning to FIG. 2, the CG 32 is a memory that stores character data for operator guidance, such as Japanese characters (Kana, Kanji), alphanumeric characters, symbols, and the like, which are displayed on the display unit 12.

The ROM 33 stores various control programs for data entry procedure (see FIGS. 8 and 9) and communication procedure (see FIG. 10) which are carried out by the CPU 36 to control each component of the digital camera 1. The control programs are stored in the form of CPU-readable program codes.

Figure 8:
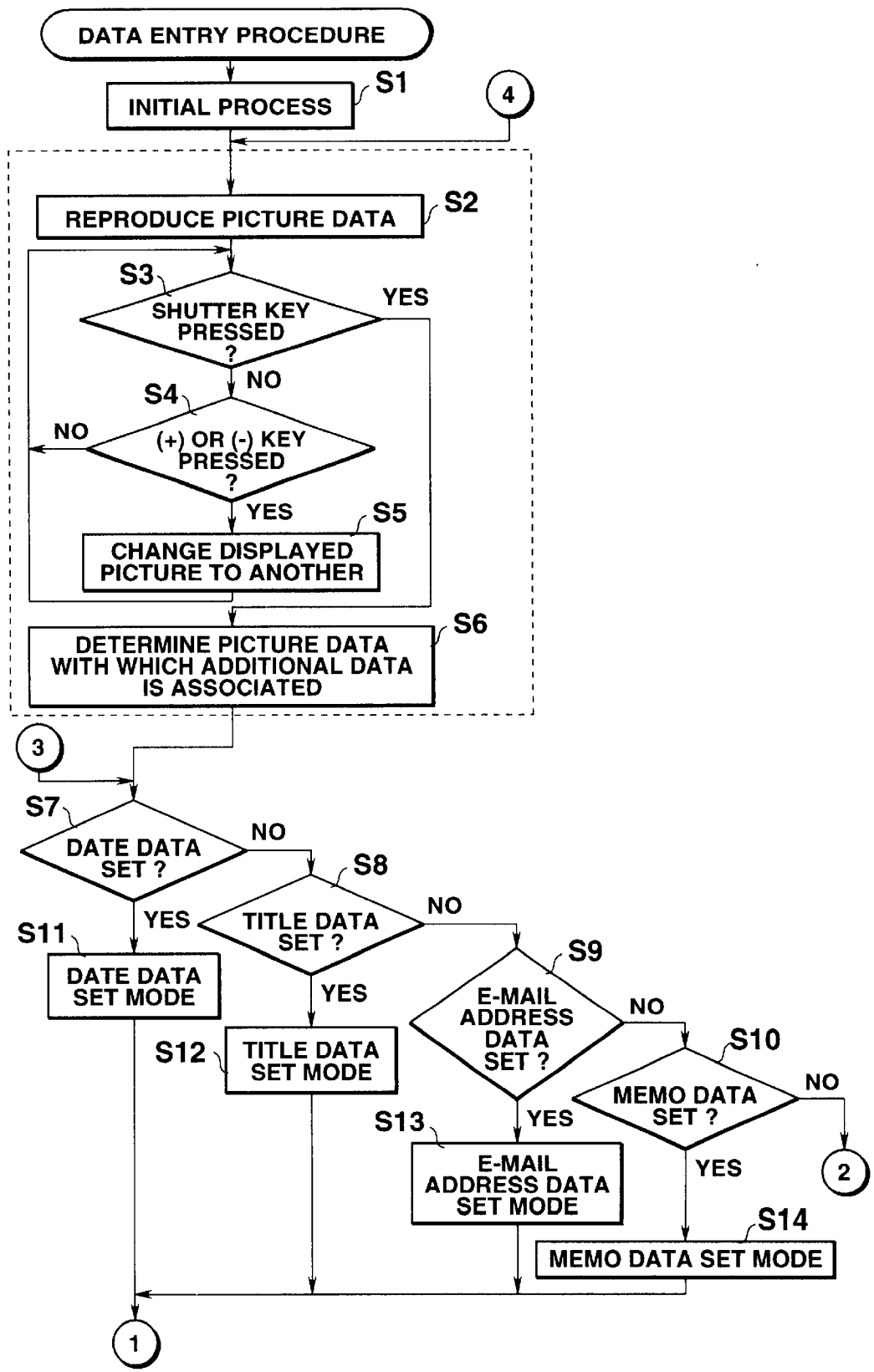
FIGS. 8 and 9 form a flowchart for data entry procedure carried out by the CPU of FIG. 2.
Figure 9:
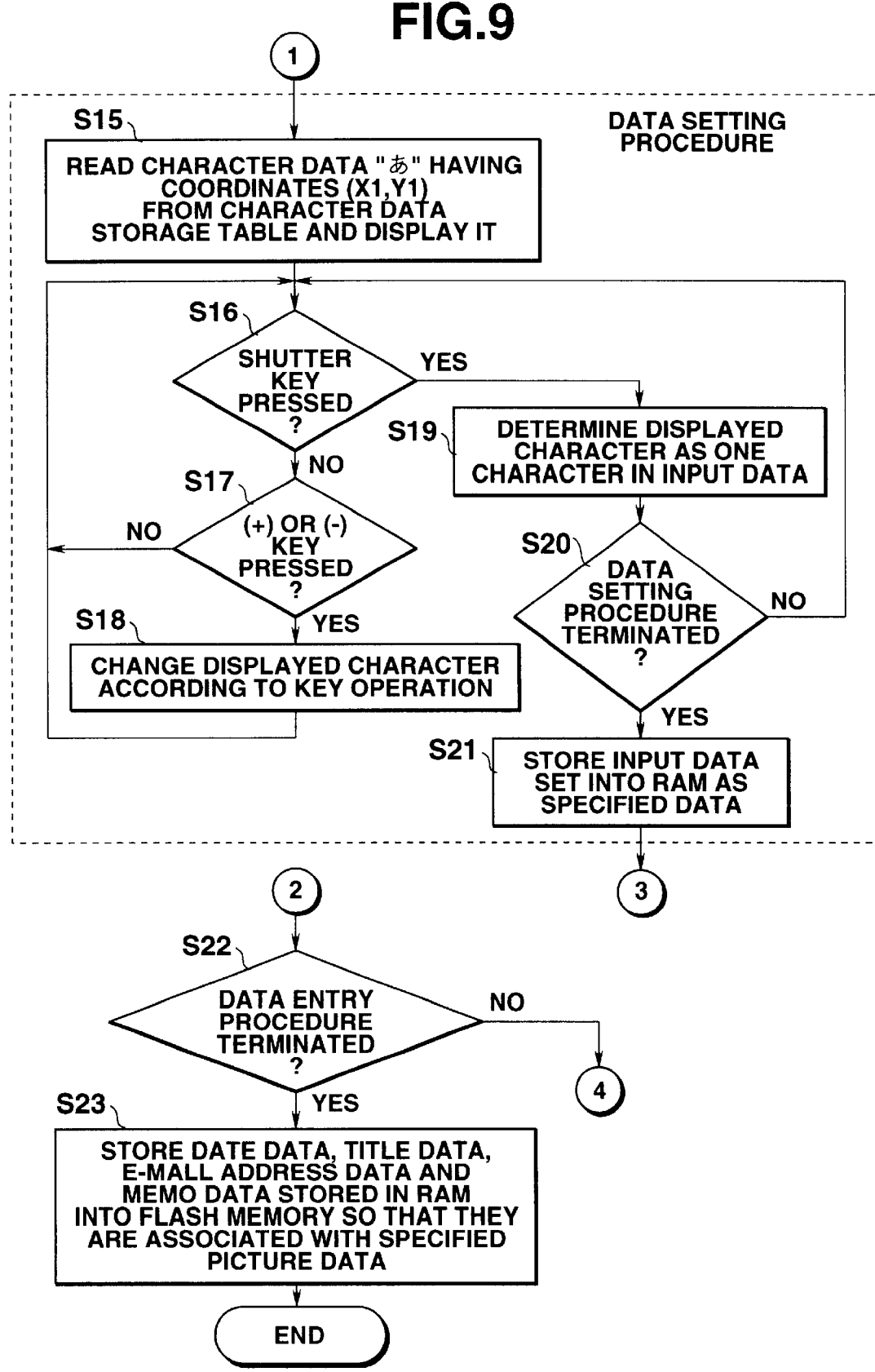

The ROM 33 also stores a character data storage table 34a (see FIG. 4) which is used in entering data in the data entry procedure (see FIGS. 8 and 9). This table is read by the CPU 36 at the time of data entry and developed in the RAM 34.

The RAM 34 forms a work area which temporarily stores various items of data to be processed at the time when various control processes are carried out by the CPU 36. In this RAM developed is the character data storage table 34a (see FIG. 4) read from the ROM 33 by the CPU 36 at the time of the data entry procedure.

FIG. 4 shows an example of the character storage table 34a developed in the RAM 34.

To allow entry of any character data, the character data storage table 34a stores character data, such as hiragana (Japanese) including double-consonant, sonant and p-sound marks, alphabet, figures, and symbols in such a way that each item of character data can be specified by coordinate data (Xn, Yn).

In the data entry procedure (see FIGS. 8 and 9), pressing the plus key 17a, the minus key 17b and the shutter key 15 allows the user to make a selection from the character data stored in the character data storage table on a character-by-character basis and enter any character data string. Thus, the user can enter date data, title data, E-mail address data, and memo data so that they are associated with picture data.

The key entry unit 35, which is composed of the mode switch 13, the power switch 14, the shutter key 15, the effect key 16, the plus key 17a, and the minus key 17b, provides various operation signals to the CPU 36 in response to user's operations of pressing or sliding the keys.

The CPU 36 is a central processing unit that controls each component of the digital camera in accordance with the control programs stored in the ROM 33. Specifically, when the data entry mode is set by the mode switch 13, the CPU performs the data entry procedure which will be described in conjunction with FIGS. 8 and 9.

In the data entry procedure, the CPU 36 displays each item of picture data stored in the flash memory 31 in sequence with each operation of pressing the plus key 17a or the minus key 17b and, when the shutter key 15 is pressed, determines picture data displayed at this point as picture data with which additional data, such as address data, is associated. The CPU 36 next reads character data from the character data storage table 34a in sequence on a character-by-character basis in response to operations of pressing the plus key 17a and minus key 17b, the character data thus read being displayed on the display unit 12. When the shutter key 15 is pressed, the character data displayed at this point is set as one character in input data. This procedure of reading and determining character data is repeated to create date data, title data, E-mail address data, and memo data, which are then stored in the flash memory 31 as additional data for the specified picture data.

When the communication mode is set by the mode switch 13, the CPU 36 carries out the communication procedure which will be described in conjunction with FIG. 10.

In this communication procedure, the CPU 36 displays each item of picture data stored in the flash memory 31 in sequence on the display unit 12 and determines picture data to be transferred to the personal computer 2 in response to a key operation. When additional data has been set for two or more items of picture data specified to be sent, the CPU makes a decision of whether to send the additional data together with picture data or not. In accordance with the result of decision, the CPU reads only the two or more picture data specified to be sent or the picture data and associated additional data from the flash memory 31 and then sends them to the personal computer 2 in the form of infrared pulses from the infrared communication unit 38.

When the shutter key 15 is pressed in the shooting mode, the CPU 36 performs a picture-capturing process to provide a picture capturing signal to the timing generator 24. In response to this, the timing generator generates a timing signal to the driver circuit 23, which, in turn, controls the exposure and readout timing of the CCD 20. Thus, a picture signal is taken out of the CCD. The picture signal is converted into digital form in the A/D converter 22. Color operations are performed on the digital picture signal from the A/D converter in the signal generator 25. The resulting picture data is stored in the DRAM 29. The CPU subjects the picture data stored in the DRAM 29 to compression in the compression/ decompression circuit 30 and then stores the picture data thus compressed in the flash memory so that new page number data is associated with it.

When the playback mode is set by the mode switch 13, the CPU 36 reads from the flash memory 31 each item of picture data in the order of page number (in ascending order of page numbers when the plus key 17a is pressed or in descending order of page numbers when the minus key 17b is pressed) and then sends it to the compression/decompression circuit 30 where the picture data is decompressed. The resulting picture data is stored in the DRAM 29. After that, the CPU sends the picture data stored in the DRAM 29 to the signal generator 25 where sync signals are added to the incoming picture data to produce a video signal (display data). The video signal is then applied through the VRAM 26, the D/A converter 27 and the amplifier 28 to the display unit 12 where a picture is reproduced on its display screen.

If, at this point, additional data, such as date data, title data, E-mail address data and memo data, is associated with the displayed picture data, then the CPU 36 reads the additional data from the flash memory 31 and displays it on the display unit together with the picture data.

The I/O port 37 is an interface that controls the input and output of serial data (picture data and page number data, date data, E-mail address data and memo data which are stored in the flash memory in such a way that they are associated with the picture data) and control data which are transferred to or from external equipment connected through the serial input/output terminal 18 and a communication cable to the digital camera 1.

The infrared communication unit 38, which is an infrared interface that allows, for example, IrDA (Infrared Data Association)-based communications between the digital camera 1 and the external equipment, controls the transmission and reception of picture data, page number data, date data, E-mail address data, memo data, and control data which are transferred by infrared communications.

To be specific, the infrared communication unit 38 comprises a modulator which modulates a carrier signal with transmit data to be sent to the external equipment, an LED (Light Emitting Diode) which sends the modulated signal in the form of infrared pulses to the external equipment through the window 19, a photodiode which receives through the window 19 an infrared signal sent from the external equipment, and a demodulator which recovers data from the received infrared signal.

The foregoing is the configuration of the digital camera 1.

Figure 5:
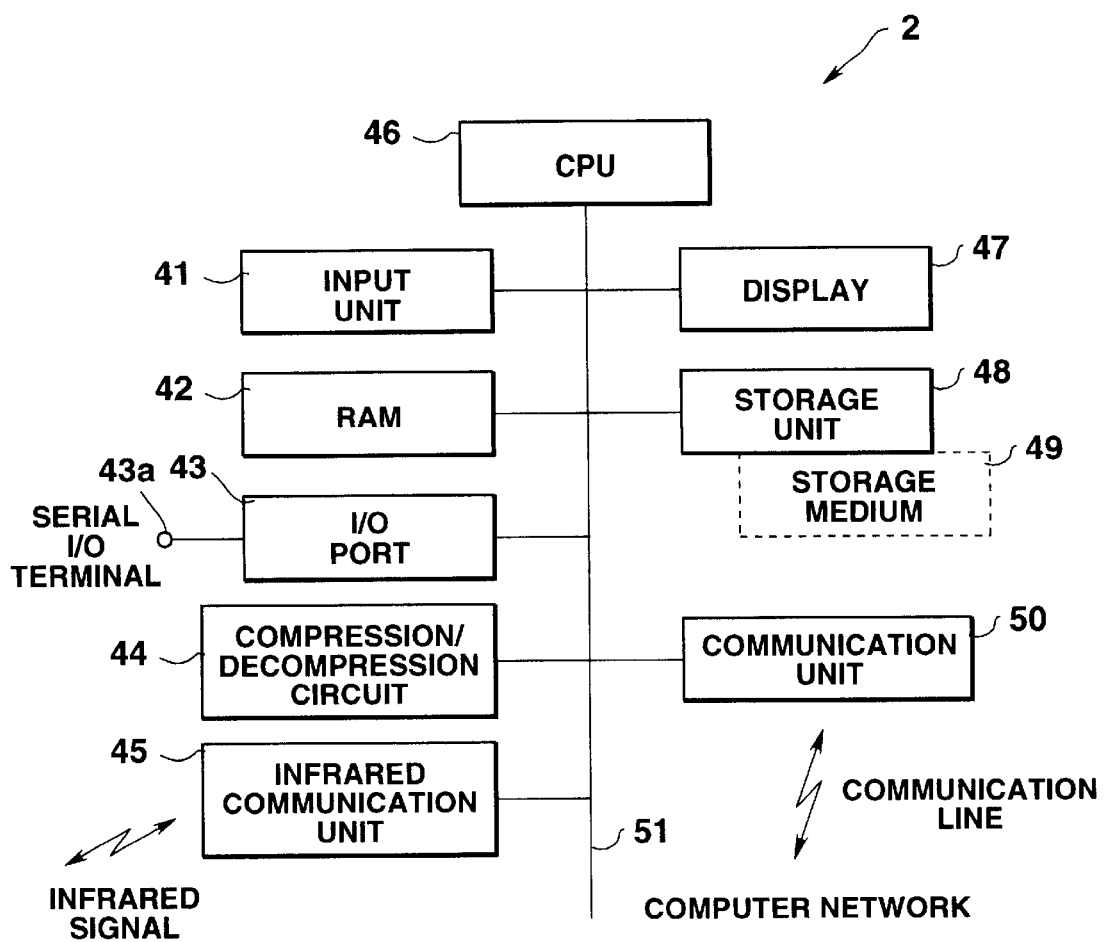
FIG. 5 shows, in block form, a circuit arrangement of a personal computer to which the present invention is applied.

Referring now to FIG. 5, there is illustrated, in block diagram form, an arrangement of a personal computer, generally indicated at 2, according to the present invention.

As shown, the personal computer 2 is composed of an input unit 41, a RAM 42, an I/O port 43, a compression/decompression circuit 44, an infrared communication unit 45, a CPU 46, a display unit 47, a storage unit 48, and a communication unit 50, which are interconnected by a bus 51.

The personal computer 2 is connectable to a computer network or the Internet through the communication unit 50 and a communication line. The computer can transmit E-mail to or receive E-mail from a terminal over the computer network or perform data retrieval, such as browsing through home pages stored on the Internet, by making use of WWW information retrieval services.

The input unit 41 comprises a keyboard and a mouse. The keyboard has function keys, alphanumeric keys, and other keys and provides various operation signals to the CPU 46 in response to keying operations by the user. The mouse is a pointing device that is used to select icons and menus displayed on the screen of the display unit 47 or select desired pictures in the mail transmission procedure (see FIG. 13) to be described later. The mouse provides relative position coordinate data and a click signal to the CPU 46.

The RAM 42 forms a memory area in which, when various control processes are performed by the CPU 46, stores temporarily various items of data to be processed.

Figure 6:
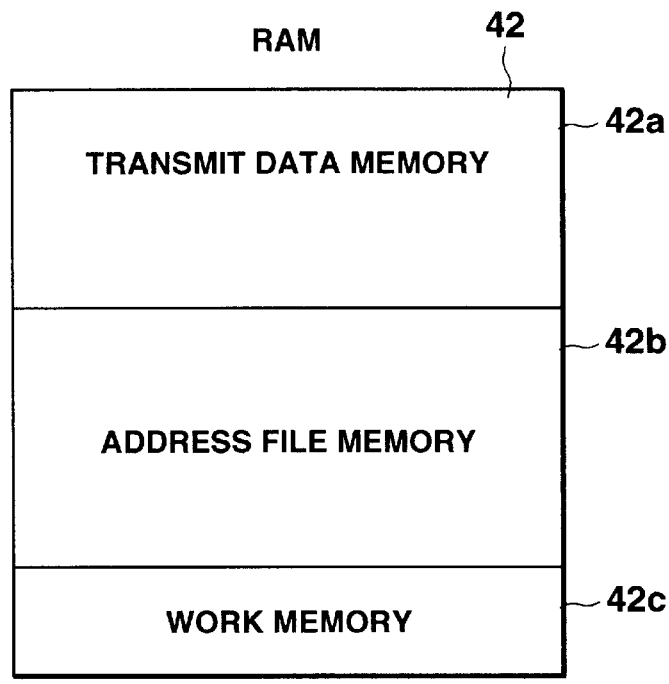
FIG. 6 shows a memory map of the RAM of FIG. 5.

FIG. 6 shows a memory organization of the RAM 42.

As shown in FIG. 6, the RAM 42 is composed of a transmit data memory 42a, an address file memory 42b, and a work memory 42c.

Figure 13:
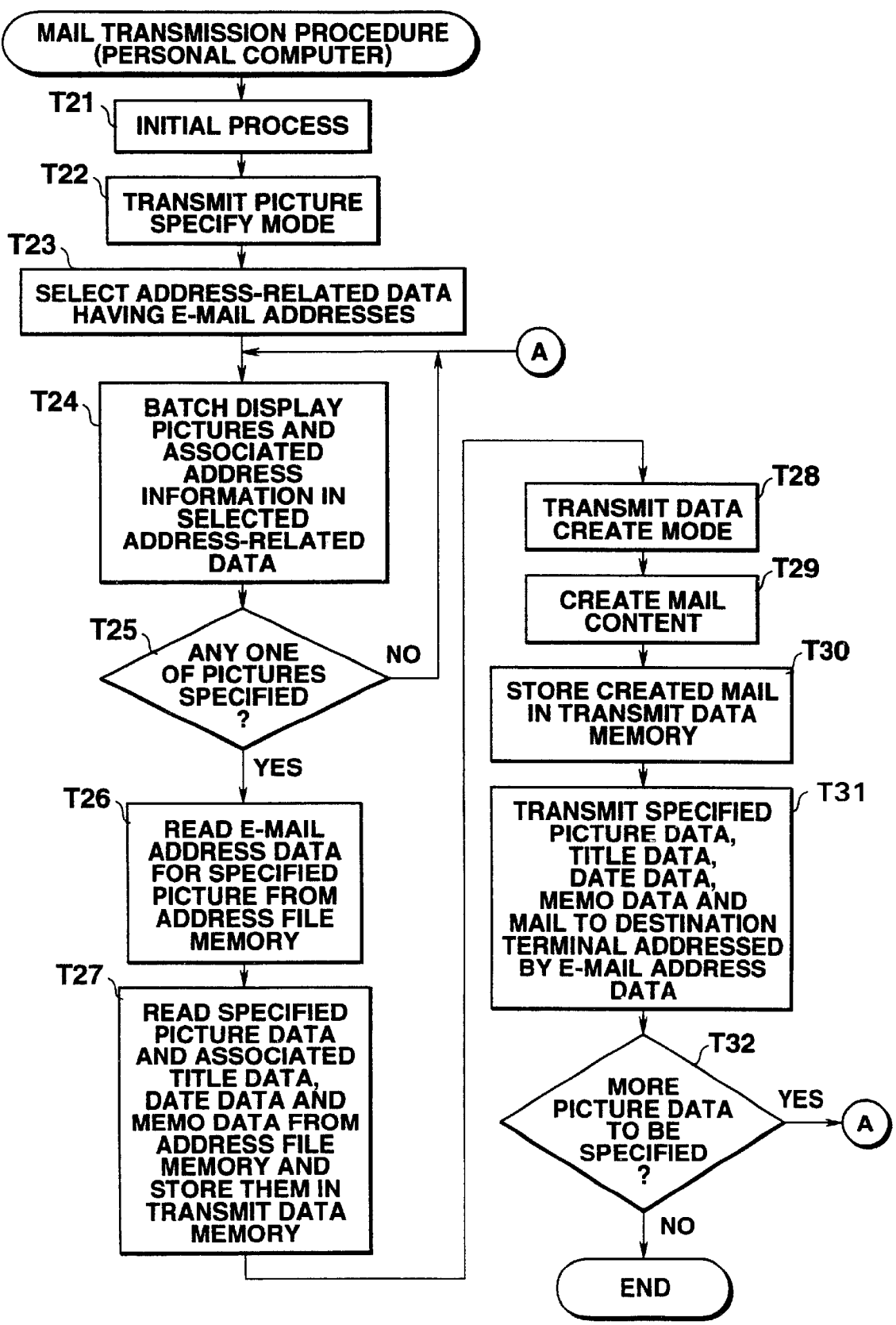
FIG. 13 is a flowchart for mail transmission by the CPU of FIG. 5.

The transmit data memory 42a serves as a memory area for temporarily storing transmit data (mail) created by the user in the E-mail transmission procedure (see FIG. 13).

The address file memory 42b serves as a memory area for temporarily storing address file data read from a storage medium 49 through the storage unit 48 by the CPU 46 in address file edit procedure (see FIG. 12) or the E-mail transmission procedure (see FIG. 3) to be described later or picture data and its additional data (address-related data to be described later) transferred from external equipment (in this embodiment, the digital camera 1) in the address file edit procedure.

Figure 7:
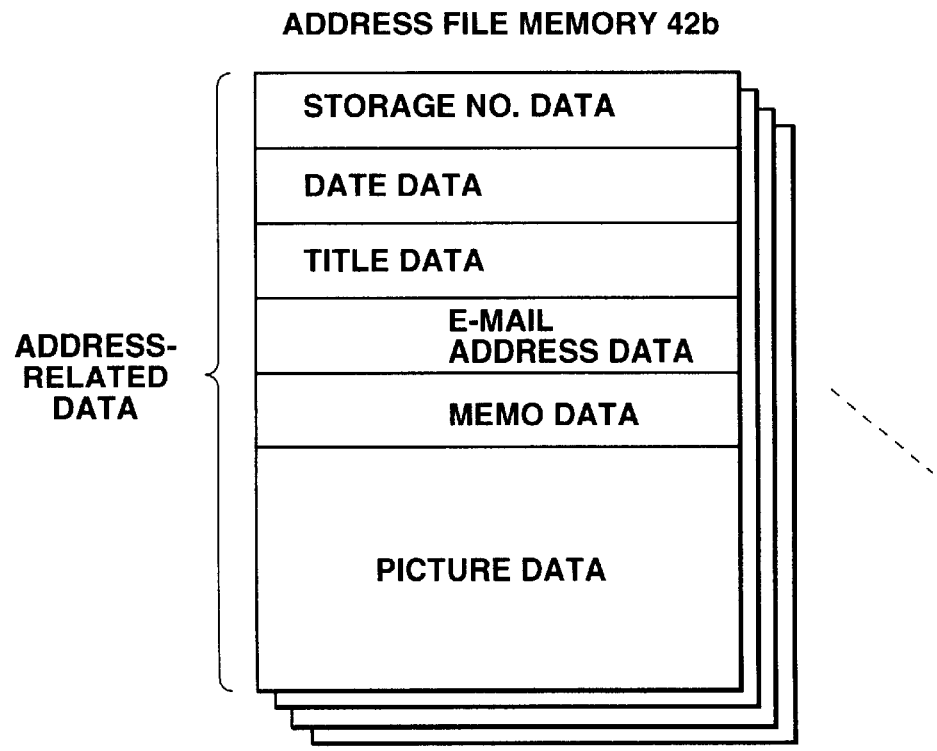
FIG. 7 shows a memory map for address file data in the address file memory of FIG. 6.

FIG. 7 shows a memory organization of the address file memory 42b for the address file data.

As shown, the address file data is composed of multiple sets of address-related data items. Each set of address-related data items includes picture data, and storage number data, date data, title data, E-mail address data and memo data which are associated with the picture data.

The storage number data is numeric data that indicates the order of storage allocated to the corresponding address-related data set.

The date data indicates the date and time when the corresponding picture was captured and the date and time when the corresponding address-related data was stored.

The title data, the E-mail address data and the memo data have already been described and hence their descriptions are deemed to be unnecessary.

The work memory 42C serves as a memory area for temporarily storing various items of data to be processed when various control processes are carried out.

The I/O port 43 is an interface that controls input and output of serial data transferred between the personal computer 2 and the external equipment connected by a serial input/output terminal 43a and a communication cable to the computer. To the serial input/output terminal 43a connectable is an RS-232 (serial type) communication cable by way of example.

The compression/decompression circuit 44, when picture data sent from external equipment and received by the I/O port 43, the infrared communication unit 45, or the communication unit 50 in the personal computer or picture data read out of the storage medium 49 is compressed, decompresses the picture data in accordance with a predetermined encoding algorithm (e.g., JPEG) and then develops the resulting picture data in the RAM 42 as instructed by the CPU 46. Conversely, the circuit 44 compresses picture data developed in the RAM 42 as instructed by the CPU. The compressed picture data is stored on a predetermined area of the storage medium 49 or sent to external equipment through the I/O port 43, the infrared communication unit 45, or the communication unit 50.

The infrared communication unit 45, which is an infrared interface that makes IrDA-based infrared communications between the personal computer 2 and external equipment, has the same arrangement as the infrared communication unit 38 in the digital camera 1. Its description is therefore deemed to be unnecessary.

The CPU 46 is a central processing unit that controls each component of the personal computer 2 in accordance with control programs and applications programs stored on the storage medium 49. Specifically, the CPU performs the address file edit procedure (refer to FIG. 12) when instructed by the input unit 41 to move to the address file edit procedure.

In the address file edit procedure, when instructed by a key operation to move to the capture mode, the CPU 46 performs communication procedure to capture address-related data that is added anew to address file data from external equipment (the digital camera 1 in this case). The picture data and its additional data transferred from the digital camera to the personal computer are associated with new storage number data and then stored in the address file memory 42b. Thereby, a new set of address-related data items is added to the address file data.

Also, the CPU 46, when instructed by the input unit 41 to make a mail transmission, performs mail transmission procedure which will be described later in conjunction with FIG. 13.

In the E-mail transmission procedure, the CPU selects sets of address-related data items containing E-mail addresses from the address file memory 42b and provides a batch display of the selected address-related data sets, each with picture data and its associated title data, memo data and E-mail address data, on the display unit in ascending order of storage number data. When one of the simultaneously displayed pictures is selectively specified with the mouse, the E-mail address data associated with the specified picture is read from the address file memory 42b. After that, the specified picture data, its associated title data, date data and memo data and mail are transmitted to the destination terminal over the communication cable and the computer network.

The display unit 47, comprising a CRT (Cathode Ray Tube) or liquid crystal display, displays display data (e.g., picture data) read from the RAM 42 by the CPU 46.

The storage unit 48 has the storage medium 49 stored with programs and data, the storage medium being formed of a magnetic or optical recording medium or a semiconductor memory. On the storage medium 49 are stored control programs for the address file edit procedure (see FIG. 12) and the E-mail transmission procedure (see FIG. 13) in the form of CPU-readable program codes. In addition, the storage medium 49 is stored with address file data created and edited by the address file edit procedure.

The storage medium 49 may be fixed to the storage unit 48 or may be removably mounted to the storage unit.

The communication unit 50 is a communication modem that performs data communication control when the personal computer is connected to a computer network by a communication cable or E-mail is sent to or received from a destination terminal over the computer network.

The foregoing is the configuration of the personal computer 2.

Next, the operation will be described.

First, reference will be made to a flowchart illustrated in FIGS. 8 and 9 to describe the data entry procedure carried out by the CPU 36 in the digital camera 1.

When the mode switch 13 is operated to set the data entry mode, the CPU 36 calls the data entry procedure program stored in the ROM 33 into execution.

The CPU 36 first performs an initial process of developing the character data storage table 34a (see FIG. 4) stored in the ROM 33 in a predetermined area of the RAM 34 (step S1) and then performs a process of specifying picture data with which additional data, such as E-mail address data, is associated.

That is, the CPU 36 reads picture data assigned page number data "1" from among, for example, 64 frames of picture data stored in the flash memory 31, subjects the read picture data to decompression in the compression/decompression circuit 30, adds sync signals to the resulting picture data in the signal generator 25 to form a video signal, and outputs the video signal to the display unit 12 to display the picture on its screen (step S2).

Next, the CPU 36 makes a decision of whether or not the shutter key 15 has been pressed (step S3). If the shutter key 15 is not pressed, then a decision is next made as to whether or not the plus key 17a or the minus key 17b has been pressed (step S4).

If the decision is that neither the plus key nor the minus key is pressed, the procedure returns to step S3. If, on the other hand, the decision is that either of the plus key and the minus key has been pressed, the CPU reads the preceding or succeeding picture from the flash memory 31 depending on which key has been pressed. That is, when the plus key is pressed, the next picture data is read and displayed. For example, when the page number data of the currently displayed picture data is "1", the picture data of page number data "2" is read from the flash memory and then displayed on the display unit. When the minus key is pressed, on the other hand, picture data of page number data that precedes that of the currently displayed picture data by one is read from the flash memory and displayed (step S5). The procedure then returns to step S3.

The above-described control procedure allows the user to retrieve a desired picture with which additional data, such as E-mail address data, is associated while displaying each of multiple pictures stored in the flash memory 31 in the digital camera in sequence.

The CPU 36, upon deciding that the shutter key 15 was pressed in step S3, determines a picture displayed on the display unit 15 at the time the shutter key was pressed as a picture with which the additional data is to be associated (step S6).

The CPU next makes a decision of which of date data, title data, E-mail data and memo data is to be set (steps S7 to S19). If no data is to be set, then the procedure goes to step S22. The CPU, upon deciding that data is to be set, enters a specified data set mode (step S11, S12, S13 or S14) and then carries out a data setting procedure (steps S15 to S22).

That is, the CPU 36 first reads character data $w$ having coordinates of (X1, Y1) out of the character storage table 34a (see FIG. 4) in the RAM 34 and then displays it on the display unit 12 (step S15).

The CPU next decides whether or not the shutter key 15 was pressed (step S16). If it is not, then the CPU makes a decision of whether or not the plus key 17a or the minus key 17b was pressed (step S17).

When the decision is that none of the keys 17a and 17b is pressed, the CPU returns to step S16; otherwise, the CPU goes to step S18 in which the displayed character is switched to another depending on the key pressed. That is, when the plus key 17a is pressed, the value for X coordinate of the coordinates (Xn, Yn) of a character being displayed is incremented by one to display a character having coordinates of (Xn+1, Yn). For example, if the character that is currently displayed is ѵ
(coordinates 'X1, Y1)), then the character ぁ
(coordinates 'X2, Y1)) is displayed next. On the other hand, when the minus key 17b is pressed, the value for Y coordinate of the coordinates (Xn, Yn) of the character being displayed is incremented by one to display a character having coordinates of (Xn, Yn+1). For example, when the character that is currently displayed is ѵ
(coordinates (Xn, Yn)), the character ぁ
(coordinates (X1, Y2)) is displayed next. After that, the procedure returns to step S16.

The CPU 36, upon deciding in step S16 that the shutter key 15 was pressed, determines a character that was displayed at the time when the shutter key was pressed as one character in input data (step S19). After that, the CPU makes a decision of whether or not the shutter key was pressed again to indicate the termination of the data setting procedure (step S20). When the data setting procedure is continued, the procedure returns to step S16 to set the next character in input data.

When the termination of the data setting procedure is indicated in step S20, the CPU stores the set input data as one of date data, title data, E-mail address data and memo data specified in step S7, S8, S9, or S10 into a predetermined area of the RAM 34 (step S21) and then returns to step S7.

The ROM 33 in the digital camera 1 is stored with a Japanese FEP (Front End Processor) which permits Hiragana characters in input data to be translated into Kanji or Katakana characters.

Such a control procedure as described above allows the user to create and set date data, title data, E-mail address data, and memo data by repeating a step of reading each of corresponding characters from the character data storage table 34a in the RAM 34 in sequence to display it on the display unit through the operation of the plus key 17a or the minus key 17b and a step of, through the operation of the shutter key 15, determining a character that is being displayed when the shutter key is pressed as one character of input data.

When none of the data setting modes is specified in steps S7 to S10, the CPU makes a decision of whether or not the termination of the data entry procedure has been indicated (step S22). When the data entry procedure is to be continued, the procedure returns to step S2.

When the effect key 16 is pressed to indicate the termination of the data entry procedure, the CPU 36 stores, in step S23, the date data, the title data, the E-mail address data, and the memo data which were created and stored in the RAM 34 in the data setting procedure (steps S15 through S21) into the flash memory 31 so that they are associated with the picture data specified in the picture data specifying procedure (steps S2 to S6) and then terminates the data entry procedure.

The foregoing is the data entry procedure carried out by the CPU 36 in the digital camera 1.

In specifying, in steps S2 to S6, picture data with which additional data, such as date data, title data, E-mail address data, and memo data, is associated, picture data for which additional data has been already set is displayed on the display unit 12 together with the additional data already set. When data entry is instructed for such picture data for which additional data has been already set, the CPU considers it to be the addition or modification of the additional data and performs the processing beginning with step S7.

In the above-described data entry procedure, the date data, the title data, the E-mail address data, and the memo data are entered and set by using the character data storage table 34a installed in the digital camera 1 and pressing the plus key 17a, the minus key 17b, and the shutter key 15. Alternatively, each item of character data may be entered from a keyboard attached to the serial input/output terminal 18a of the digital camera 1 or external equipment (for example, a personal computer) connected to the serial input/output terminal by a communication cable. In either case, the entered data is set by the shutter key.

In addition, character data may be obtained from character pictures taken by the digital camera through character recognition techniques and set as each item of data. Or, a touch panel may be put on the screen of the display unit 12 to provide a handwriting entry facility, so that character data is obtained from pen-input characters through character recognition techniques and set as each item of data.

In the flowchart shown in FIGS. 8 and 9, desired picture data is selected from picture data stored in the flash memory 31 and additional data is entered and set for the selected picture data. The following modifications are also possible.

A modification is such that, after the completion of shooting, additional data is entered and set for captured picture data.

Another modification is such that additional data, which has been entered and set beforehand, is automatically associated with captured picture data.

Still another modification is such that additional data can be entered and set simultaneously for all or two or more items of picture data stored in the flash memory, that is, one item of additional data (E-mail address data in particular) is associated with two or more items of picture data.

A further modification is such that two or more items of additional data (E-mail address data in particular) can be entered and set for one item of picture data selected from picture data stored in the flash memory.

Next, the communication procedure carried out by the CPU 36 in the digital camera will be described with reference to a flowchart shown in FIG. 10.

When the communication mode is set by the mode switch 13, the CPU 36 reads from the ROM 33 a communication-related program into execution that is related to communication processing which conforms to the form of communications between the digital camera 1 and the external equipment (personal computer in this embodiment).

The following communication procedure describes the transfer of picture data and its associated additional data stored in the flash memory 31 in the digital camera to the personal computer 2 through the use of the infrared communication unit 38.

First, the CPU 36 performs an initial process such as initialization (step S31). Next, the CPU sets up and establishes communication conditions, such as transmission rate, pulse width, modulation scheme, for data transfers to or from external equipment in accordance with a predetermined communication protocol (step S32) and then enters the transferred picture specification mode (S33).

In the transferred picture specify mode, the CPU 36 first performs the processes in steps S34 to S38 identical to steps S2 to S6 in the data entry procedure (refer to FIGS. 8 and 9), whereby each of two or more pictures stored in the flash memory 31 is displayed in sequence by successive operation of the plus key 17a or the minus key 17b and a picture to be sent to the personal computer is specified by operating the shutter key 15.

If, at this point, additional data has been set for picture data displayed on the display unit 12, then the additional data will also be displayed together with the picture data.

Figure 11:
FIG. 11 shows an example of a picture displayed on the display unit of FIG. 2 and its associated data.

FIG. 11 shows an example of a picture displayed on the display unit and its associated additional data.

This figures shows a portrait of Hanako Suzuki displayed on the display unit 12 as picture data with "Hanako Suzuki (name)" set as title data and "hanaco-suzuki@000.co.or.jp" as E-mail address data. In this display example, "18" at the upper right of the screen indicates the page number data associated with the picture data.

In displaying additional data together with picture data, the additional data may be displayed superimposed upon a plate so as to make it easier to view.

The CPU next makes a decision of whether there is another picture or pictures to be sent or not on the basis of a key operation (step S39). When the effect key 16 is pressed to indicate the presence of a picture or pictures to be sent, the CPU returns to step S35 to continue the process of specifying pictures to be sent.

When the shutter key 15 is pressed to indicate that there is no picture to be sent, the CPU displays a message inquiring as to whether to send additional data together with the corresponding picture or not when additional data is set for each of one or more pictures for which transfer is specified (step S40) and then makes a decision of whether to send additional data on the basis of a key operation (step S41).

When the shutter key 15 was pressed to indicate that the additional data is also to be sent together with the picture data, the CPU reads one or more pictures for which transfer is specified and their associated additional data from the flash memory, outputs them to the infrared communication unit 38, sends them to the personal computer 2 via infrared signals (step S42), and goes to step S44.

When, in step S41, the effect key 16 was pressed to indicate that only the picture data is to be transferred, the CPU reads from the flash memory only one or more pictures for which transfer has been specified, outputs them to the infrared communication unit 38, and transfers them to the personal computer 2 via infrared pulses (step S43).

The CPU 36 then sends a transfer completion signal to the personal computer 2 (step S44) and makes a decision of whether or not a receive completion signal was received from the personal computer (step S45). Upon receipt of the receive completion signal, the CPU terminates the communication procedure.

Figure 10:
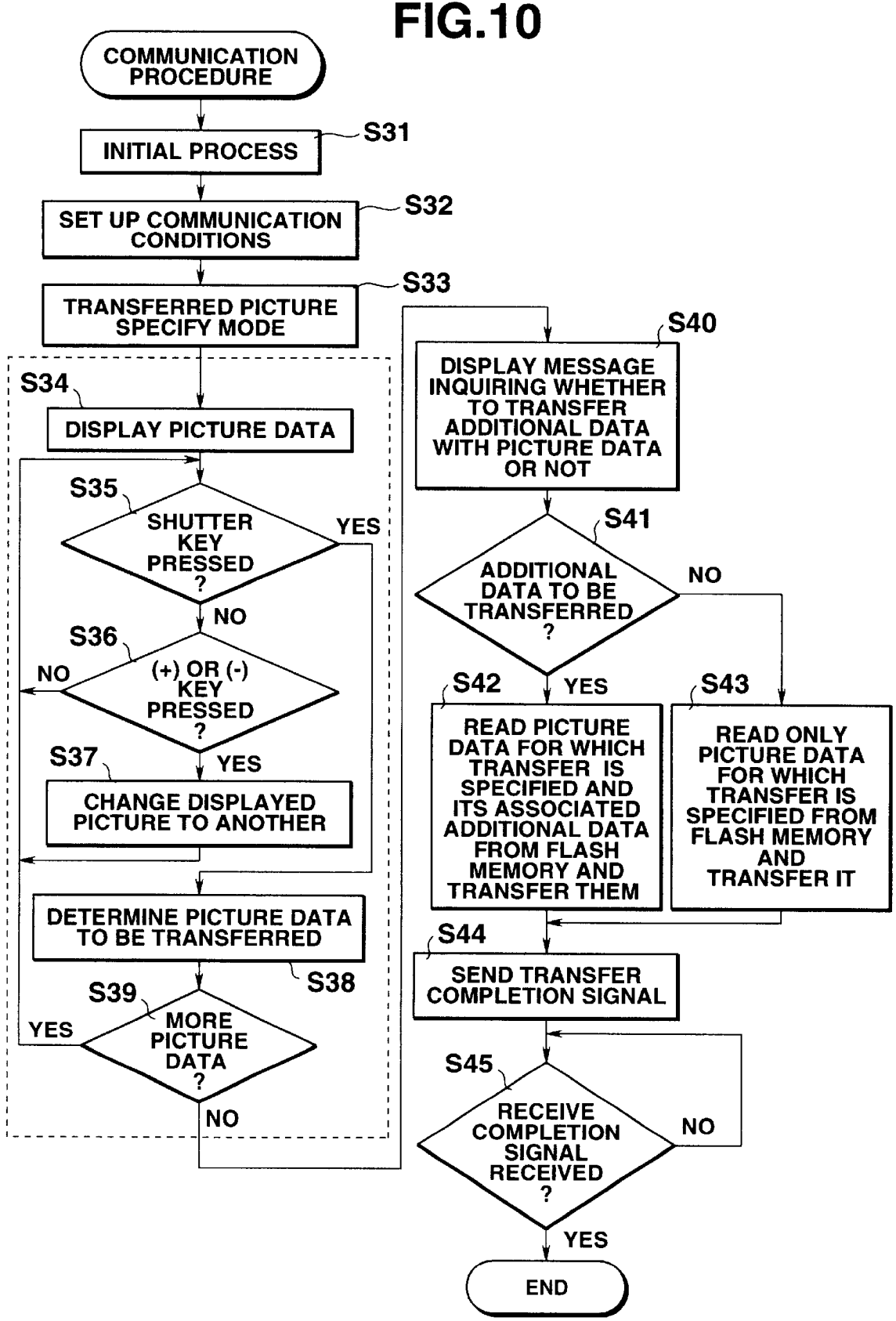
FIG. 10 is a flowchart for communication procedure carried out by the CPU of FIG. 2.

Although, in the flowchart of FIG. 10, pictures to be transferred are specified one by one, it is also possible to make a batch transfer of pictures and their associated additional data stored in the flash memory 31, a batch transfer of pictures containing E-mail address data and their associated additional data, or a batch transfer of pictures that contain E-mail address data and have not been transferred yet and their associated additional data.

The foregoing is the communication procedure carried out by the CPU 36 in the digital camera 1.

Figure 12:
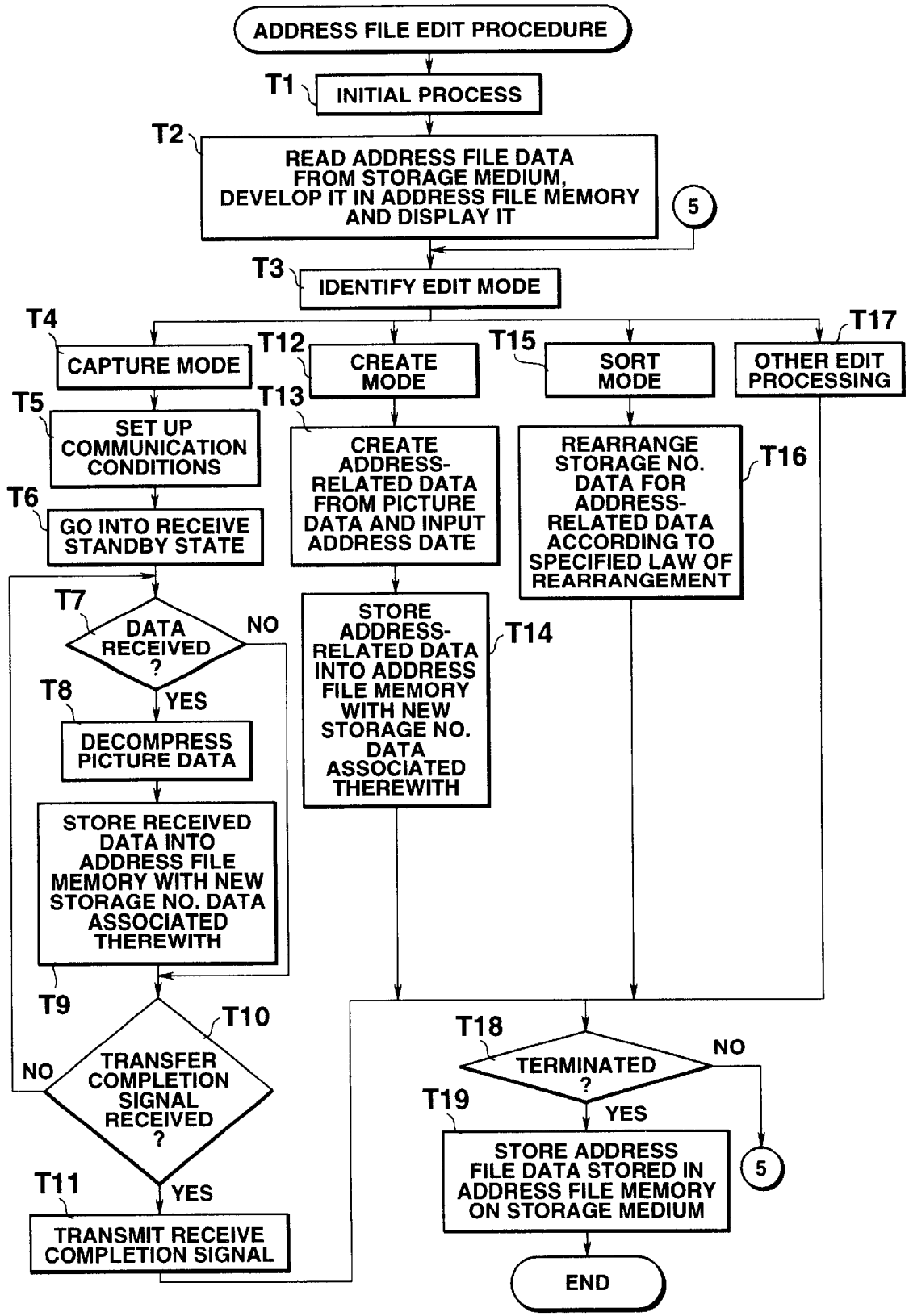
FIG. 12 is a flowchart for address file editing by the CPU of FIG. 5.

Next, the address file edit procedure carried out by the CPU 46 in the personal computer 2 will be described with reference to a flowchart shown in FIG. 12.

When instructed by the input unit 41 to move to the address file edit procedure, the CPU 46 reads an address file edit program from the storage unit 48 into execution.

First, the CPU 46 performs an initial process such as initialization (step T1), then reads address file data from a predetermined area of the storage unit 49, develops them in the address file memory 42b in the RAM 42, and makes a batch display of their contents on the display unit 47 (step T2).

When the decision is that one of the pictures has been specified, the CPU 46 reads E-mail address data associated with the specified picture from the address file memory 42b and temporarily stores it in a predetermined area of the work memory 42c (step T26). The CPU then reads the specified picture data and its associated title data, date data and memo data from the address file memory 42b and stores them in the transmit data memory 42a (step T27).

When the capture mode is specified by the key operation, the CPU 46 enters the capture mode (step T4). In this mode, the CPU performs a communication procedure to capture address-related data to be newly added to the address file data from the external equipment (the digital camera 1 in this embodiment).

The following communication procedure describes the capture of picture data and its associated additional data into the personal computer 2 from the digital camera 1 as address-related data to be newly added through the use of the infrared communication unit 45.

First, the CPU 46 sets up and establishes communication conditions, such as data transmission rate, pulse width, modulation scheme, etc., for data transfer based on a predetermined communication protocol (step T5) and then goes into the receive standby state (step T6).

After that, the CPU 46 makes a decision of whether or not data has been received by the infrared communication unit 45 (step T7) and, if it has not, goes to step T10. If, on the other hand, the decision is that data has been received, then the CPU sends the received data (picture data and its associated additional data sent from the digital camera 1 to the personal computer 2 in accordance with the communication procedure described in conjunction with FIG. 10) to the compression/decompression circuit 44 for decompression (step TB). The CPU then stores the decompressed data into the address file memory 42b in the RAM 42 with which new storage number data is associated (step T9). That is, the data is added to the address file data as new address-related data.

After that, the CPU 46 makes a decision of whether or not a transfer completion signal has been received from the digital camera 1 (step T10). If it has not, then the procedure returns to step T7. If the decision is that the transfer completion signal has been received, the CPU sends a receive completion signal to the digital camera (step T11) and then goes to step T18.

Such a control procedure permits, in the capture mode, the personal computer to capture one or more items of address-related data to be added to the address file data from the digital camera 1 through infrared communications.

When instructed by a key operation to go to the create mode in step T3, the CPU 46 goes to the create mode (step T12) in which a process is carried out by which address-related data to be added to the address file data is created in the personal computer 2.

That is, the CPU 46 creates address-related data on the basis of picture data created by picture edit software (application software) in the personal computer 2 or picture data captured from the digital camera 1 and E-mail address data, memo data, data on the name of a person to which transmission is made, and retrieval item data which are entered from the input unit 41 (step T13). The created address-related data is stored in the address file memory 42b with new storage number data, so that new address-related data is added to the address file data (step T14). The CPU then goes to step T18.

When instructed by a key operation in step T3 to go into the sort mode (rearrange mode), the CPU 46 goes into the sort mode (step T15). In this mode, the CPU rearranges the address-related data developed in the address file memory 42b.

That is, the CPU 46 rearranges the order of storing the address-related data, i.e., the storage number data for the address-related data, according to a specified law of rearrangement, for example, in the order of the kana syllabary of name data in E-mail address data (step T16) and then goes to step T18.

When instructed by a key operation in step T3 to go to an edit mode other than the capture mode, create mode, and sort mode, the CPU goes to the specified edit mode to perform the edit procedure (step T17). Edit procedure other than the capture mode, create mode and sort mode include changing and deleting the contents of each item of address-related data.

The CPU 46 decides whether to terminate the current address file edit procedure or not on the basis of a key operation in step T18. When instructed not to terminate the edit procedure, the CPU returns to step T3. On the other hand, when instructed to terminate the edit procedure, the CPU stores the address file data developed in the address file memory 42b in the RAM 42 into a predetermined area of the storage medium 49 through the storage unit 48 (step T19), thereby terminating the address file edit procedure.

The foregoing is the address file edit procedure carried out by the CPU 46 in the personal computer 2.

Hereinafter, the mail transmission procedure carried out by the CPU 46 in the personal computer 2 will be described with reference to a flowchart shown in FIG. 13.

When instructed by the input unit 41 to go to the mail transmission procedure, the CPU 46 calls a mail transmitting program from the storage medium 49 through the storage unit 48 into execution.

The CPU 46 first performs an initial process such as reading address file data stored in a predetermined area of the storage medium 49 and developing it in the address file memory 42b in the RAM 42 (step T21) and then going into the transmit picture specify mode (step T21). In this transmit picture specify mode, the CPU 46 first selects address-related data having E-mail address data from address file data developed in the address file memory 42b (step T23). The CPU then provides, on the display unit 47, a batch display of items of picture data and their associated title data, memo data and E-mail address data in the selected address-related data in ascending order of their storage number data (step T24).

The CPU next makes a decision as to whether any one of the simultaneously displayed pictures has been specified with the mouse (step T25). When none of the pictures is specified, the CPU returns to step T24.

When the decision is that one of the pictures has been specified, the CPU 46 reads E-mail address data associated with the specified picture from the address file memory 42b and temporarily stores it in a predetermined area of the work memory 42c (step T26). The CPU then reads the specified picture data and its associated title data, date data and memo data from the address file memory 42b and stores them in the transmit data memory 42a (step T27).

The CPU then reads the specified picture data and its associated title data, date data and memo data from the address file memory 42b and stores them in the transmit data memory 42a (step T27).

The CPU 46 then goes into the transmit data create mode (step T28), creates transmit mail data on the basis of user's key inputs from the input unit 41 (step T29) and temporarily stores the created mail data into the transmit data memory 42a (step T30).

Next, the CPU 46 reads the E-mail address data from the work memory 42c and reads the specified picture data, its associated title data, date data and memo data, and the mail data from the transmit data memory 42a, which, in turn, are sent to the communication unit 50.

The communication unit 50 connects the personal computer 2 to a computer network through a communication line according to a preset access code under the control of the CPU 46 and then sends the specified picture data and its associated title data, date data, memo data and the mail to a destination terminal addressed by the E-mail address data (step T31).

The CPU next makes a decision as to whether there is more picture data to be sent on the basis of a user's key operation (step T32). When the effect key 16 is pressed to indicate that there is more picture data to be sent, the CPU returns to step T24 to repeat the picture data specify procedure.

When the shutter key 15 is pressed to indicate that there is no more picture data, the CPU terminates the mail transmission procedure in response to the termination of mail transmission in the communication unit 50.

The foregoing is the mail transmission procedure carried out by the CPU 46 in the personal computer 2.

Such a configuration allows a mode of use of the electronic camera system of the present invention which is such that the user retains a picture which was shot together with a person with whom the user got acquainted during his or her journey in the digital camera with the person's E-mail address data, sends the picture and its associated E-mail address data to the personal computer 2 after return from the journey, and transmits the picture to that person by simply selecting it from pictures displayed on the display unit in the personal computer.

In the above-described mail transmission procedure (FIG. 13), the CPU enters the transmit data create mode after a picture has been specified, and, in this mode mail created based on key inputs is transmitted together with the specified picture. Alternatively, the picture may be transmitted together with its associated title data, date data and memo data immediately after it has been specified without going into the transmit data create mode.

In step T23 in the mail transmission procedure, all the address-related data having E-mail address data are selected. Alternatively, address-related data having untransmitted picture data and E-mail data may be selected as in a modification 1 (see FIG. 14) of the mail transmission procedure which will be described below.

Figure 14:
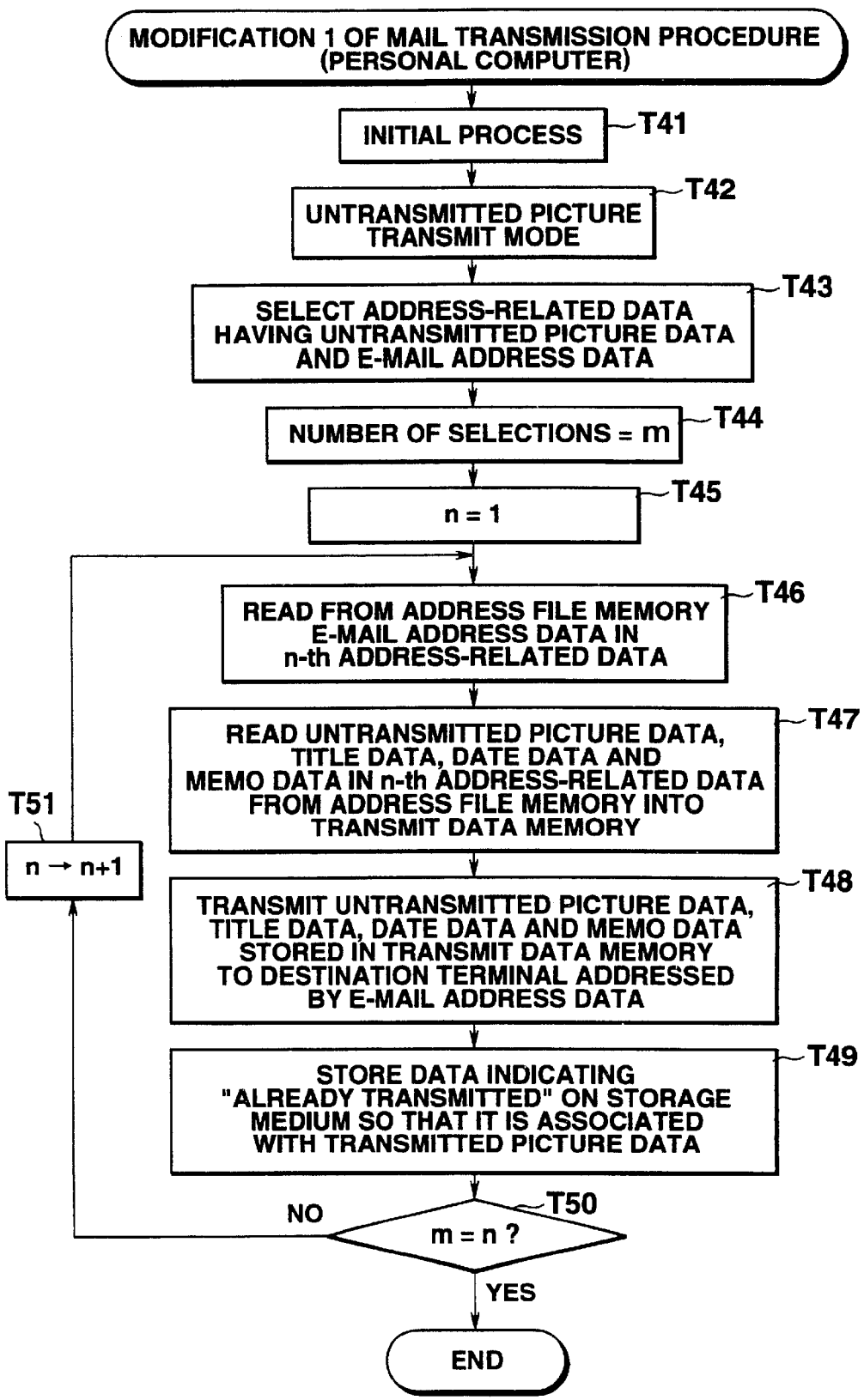
FIG. 14 shows a first modification of the flowchart for mail transmission of FIG. 13.
Figure 15:
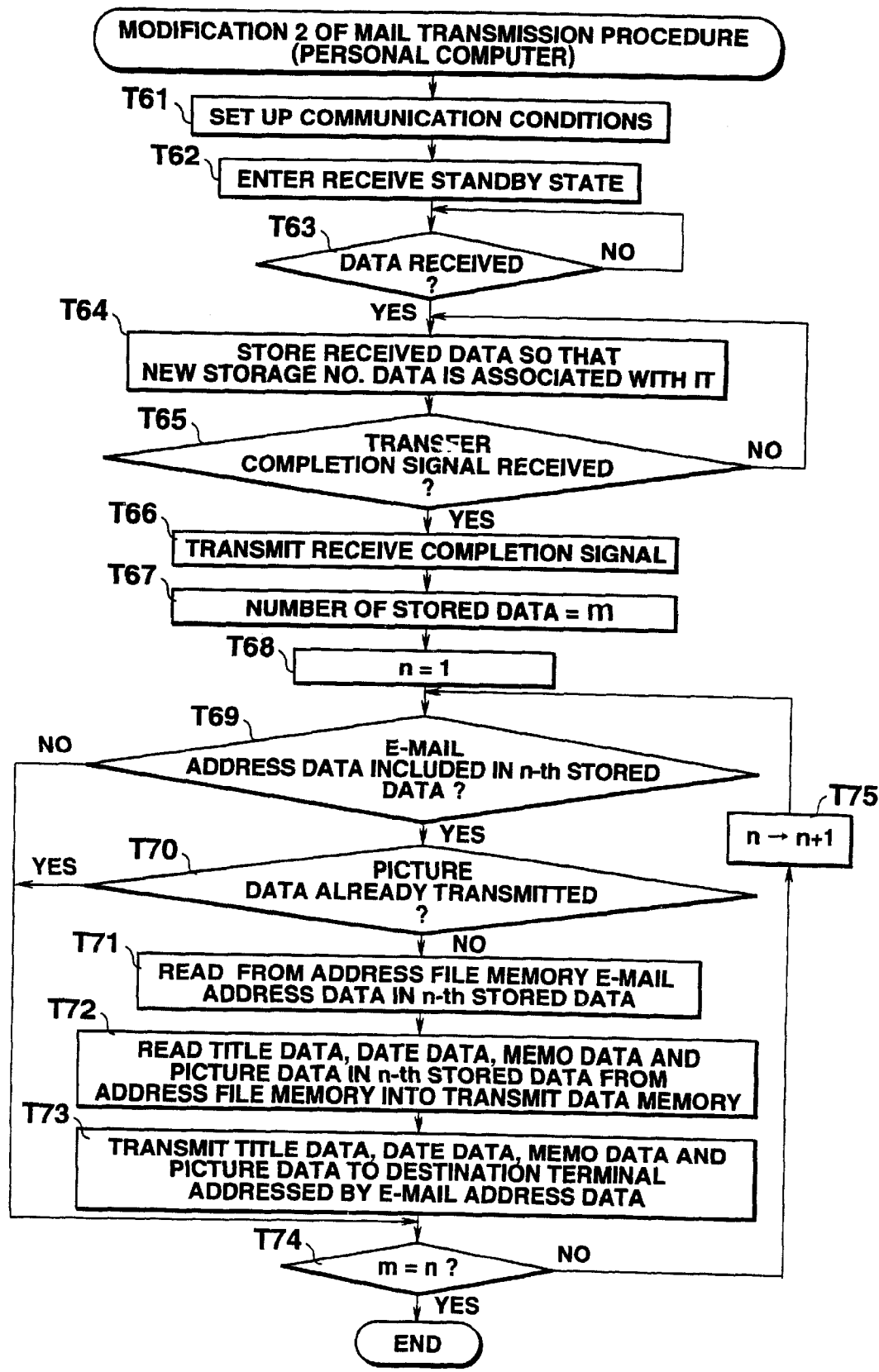
FIG. 15 shows a second modification of the flowchart for mail transmission of FIG. 13.

The above-described mail transmission procedure may be modified as shown in FIG. 14 or FIG. 15. The modifications 1 and 2 of the mail transmission procedure will be described hereinafter.

First, reference will be made to FIG. 14 to describe the modification 1 of the mail transmission procedure.

When instructed by the input unit 41 to go to the mail transmission procedure, the CPU 46 calls a mail transmitting program from the storage medium 49 through the storage unit 48 into execution.

The CPU first performs an initial process of reading address file data from a predetermined area of the storage medium 49 and developing it in the address file memory 42b in the RAM 42 (step T41) and then goes into the untransmitted picture transmit mode (step T42). In this untransmitted picture transmit mode, the CPU first selects address-related data having untransmitted picture data and E-mail address data from the address file data developed in the address file memory 42b (step T43). A decision as to whether picture data is untransmitted or not is made on the basis of whether or not information indicating "already transmitted", which will be described later, has been stored associated with picture data.

The number (m) of the selected items of address-related data is temporarily stored in a predetermined area of the work memory 42c (step T44) and, as a specification number, n, for specifying the n-th item of address-related data of the selected address-related data, "1" is first stored temporarily in a predetermined area of the work memory 42c (step T45).

Next, the E-mail address data in the n-th address-related data is read from the address file memory 42b on the basis of the specification number, n, stored in the work memory 42c and then temporarily stored in a predetermined area of the work memory 42c (step T46). And title data, date data, memo data and untransmitted picture data in the n-th address-related data are read from the address file memory 42b and then temporarily stored into the transmit data memory 42a (step T47).

Next, the CPU 46 reads the E-mail address data from the work memory 42c and reads the title data, date data, memo data and untransmitted picture data from the transmit data memory 42a. The E-mail address data, title data, date data, memo data and untransmitted picture data are transferred to the communication unit 50.

The communication unit 50 connects the personal computer 2 to the computer network through a communication line and transmits the title data, date data, memo data, and untransmitted picture data to a destination terminal addressed by the E-mail address data (step T48).

Next, data indicating that picture data has been already transmitted is added to the corresponding address file data stored on the storage medium 49 and containing the picture data transmitted in step T48 (step T49).

In subsequent step T50, a decision is made as to whether or not n=m, that is, as to whether or not all the untransmitted picture data contained in the address-related data selected in step T43 have been transmitted to their respective destination terminals addressed by the corresponding E-mail address data.

If n≈m, that is, the decision is that there still remains untransmitted picture data, then the procedure goes to step T51 in which the specification number, n, stored in the work memory 42c is incremented by one. After that, the procedure returns to step T46 to continue the transmission of untransmitted picture data in the n-th address-related data.

The processes in steps T46 to T51 are repeated m times. The mail transmission procedure terminates when it is decided in step T50 that n=m.

In the modification 1 of the mail transmission procedure described above, address-related data containing untransmitted picture data and E-mail address data are selected in step T43. If, for example, address-related data having picture data already transmitted is automatically erased, the need of selecting untransmitted picture data is eliminated, allowing all of address-related data having E-mail address data to be selected.

Next, the modification 2 of the mail transmission procedure will be described with reference to a flowchart shown in FIG. 15.

In this procedure, the CPU 46 first sets up and establishes communication conditions for data transfer to or from the digital camera 1 to conform to a predetermined communication protocol (step T61) and then goes into the receive standby state (step T62).

The CPU 46 makes a decision of whether or not data has been received in the infrared communication unit 45 (step T63). If it has not, the CPU returns to step T63 to continue monitoring data.

At this point, the user at the digital camera 1 is performing the communication procedure described in conjunction with FIG. 10. That is, the user retrieves and specifies pictures to be sent to destination terminals while sequentially displaying pictures and E-mail addresses stored in the flash memory 31 in the digital camera on the display unit 12 and sends specified picture data and additional data (title data, date data, E-mail address data, and memo data), i.e., address-related data to the personal computer 2.

Upon deciding in step T63 that data has been received, the CPU 46 stores the received picture data and its associated additional data into the address file memory 42b in the RAM 42 with storage number data added (step T64).

After that, the CPU 46 makes a decision of whether or not a transmit completion signal has been received from the digital camera 1 (step T65). If the decision is that the transmit completion signal has been received, then the CPU 46 sends a receive completion signal to the digital camera 1 (step T66); otherwise, the CPU returns to step T64.

The storage number, m, of items of picture data and additional data (address-related data) stored in the address file memory 42b is stored temporarily in a predetermined area of the work memory 42c (step T67). As a specification number, n, for specifying the n-th data of the stored address-related data, "1" is first stored in a predetermined area of the work memory (step T68).

Next, a decision is made on the basis of the specification number, n, stored in the work memory 42c as to whether or not E-mail address data is included in the n-th stored data (step T69).

If it is, the procedure goes to step T70 in which a decision is further made as to whether or not the picture data included in the n-th stored data has been already transmitted, that is, as to whether or not the picture data was received in the past and has been already transmitted to a destination terminal.

If the decision is that the picture data has not been already transmitted, then the CPU goes to step T71.

When it is decided in step T69 that E-mail address data is not included and it is decided in step T70 that the picture data has been already transmitted, the CPU goes to step T74 without going to steps T71, T72 and T73.

If it is decided in step T70 that the picture data has not been already transmitted, E-mail address data in the n-th stored data is read from the address file memory 42b on the basis of the specification number, n, stored in the work memory 42c and then temporarily stored in a predetermined area of the work memory 42c (step T71). The title data, date data, memo data and picture data in the n-th stored data are read from the address file memory 42b and then temporarily stored in the transmit data memory 42a (step T72).

The CPU next reads the E-mail address data from the work memory 42c and the title data, date data, memo data, and picture data from the transmit data memory 42a and then transfers them to the communication unit 50.

The communication unit 50 connects the personal computer 2 to the computer network through a communication line and transmits the title data, date data, memo data, and picture data to a destination terminal addressed by the E-mail address data (step T73).

Next, a decision is made in step T74 as to whether or not n=m, that is, as to whether or not the processes in steps T69 to T73 have been performed on all the data stored in step T64.

If n≠m, that is, if the decision is that there still remains unprocessed stored data, the CPU goes to step T75 in which the specification number, n, stored in the work memory 42c is incremented by one and then returns to step T69 to continue processing for the n-th stored data.

The processes in steps T69 to T75 are repeated m times. The mail transmission procedure comes to an end when it is decided in step T74 that n=m.

Such a configuration, unlike the mail transmission procedure described in conjunction with FIG. 13, eliminates the need of selecting and specifying picture data to be sent.

In the above-described modification 2 of the mail transmission procedure, a decision is made in step T69 as to whether or not E-mail address data is included in the stored data. If the digital camera is arranged to send only stored data including E-mail address data, the decision in step T69 can be omitted.

In addition, in the modification 2 of the mail transmission procedure, a decision is made in step T70 as to whether or not picture data in the stored data is picture data already transmitted. If the digital camera is arranged to send only stored data including untransferred picture data and E-mail address data as will be described later in conjunction with FIG. 16, decision steps T69 and T70 can be omitted.

In the modification 2, mail transmissions are made in succession after all the stored data have been received. Alternatively, a mail transmission may be made each time one item of stored data is received.

Further, in the modification 2 of the mail transmission procedure, the digital camera 1 is arranged to perform the communication procedure described previously in conjunction with FIG. 10 for transfer of picture data and additional data (address-related data) to the personal computer 2. The communication procedure may be of such a type shown in FIG. 16. Hereinafter, this modification of the communication procedure will be described.

The CPU 36 first performs an initial process such as initialization (step S51). After that, the CPU 36 sets up and establishes communication conditions, such as data transmission rate, pulse width, modulation scheme, etc., for data transfer to or from a destination terminal adapted for infrared communications in accordance with a predetermined communication protocol (step S52) and then goes into the untransferred picture transfer mode (step S53). In this untransferred picture transfer mode, the CPU 36 first selects address-related data having untransferred picture data and E-mail address data from the flash memory 31 (step S54). A decision as to whether or not picture data is untransferred picture data is made on the basis of whether or not information indicating that transfer has been already made is stored associated with picture data.

Untransferred picture data and its associated additional data (address-related data) selected for transfer are read from the flash memory 31 into the infrared communication unit 38 and then transferred to the personal computer 2 in the form of infrared pulses (step S55).

The CPU 36 then sends a transfer completion signal to the personal computer 2 (step S56), and makes a decision of whether or not a receive completion signal has been received from the personal computer (step S57). Upon receipt of the receive completion signal, the CPU stores into the flash memory additional data indicating that transfer has been already made so that it is associated with the picture data transferred in step S55 (step S58).

The foregoing is the modified communication procedure carried out by the CPU 36 in the digital camera 1.

Figure 16:
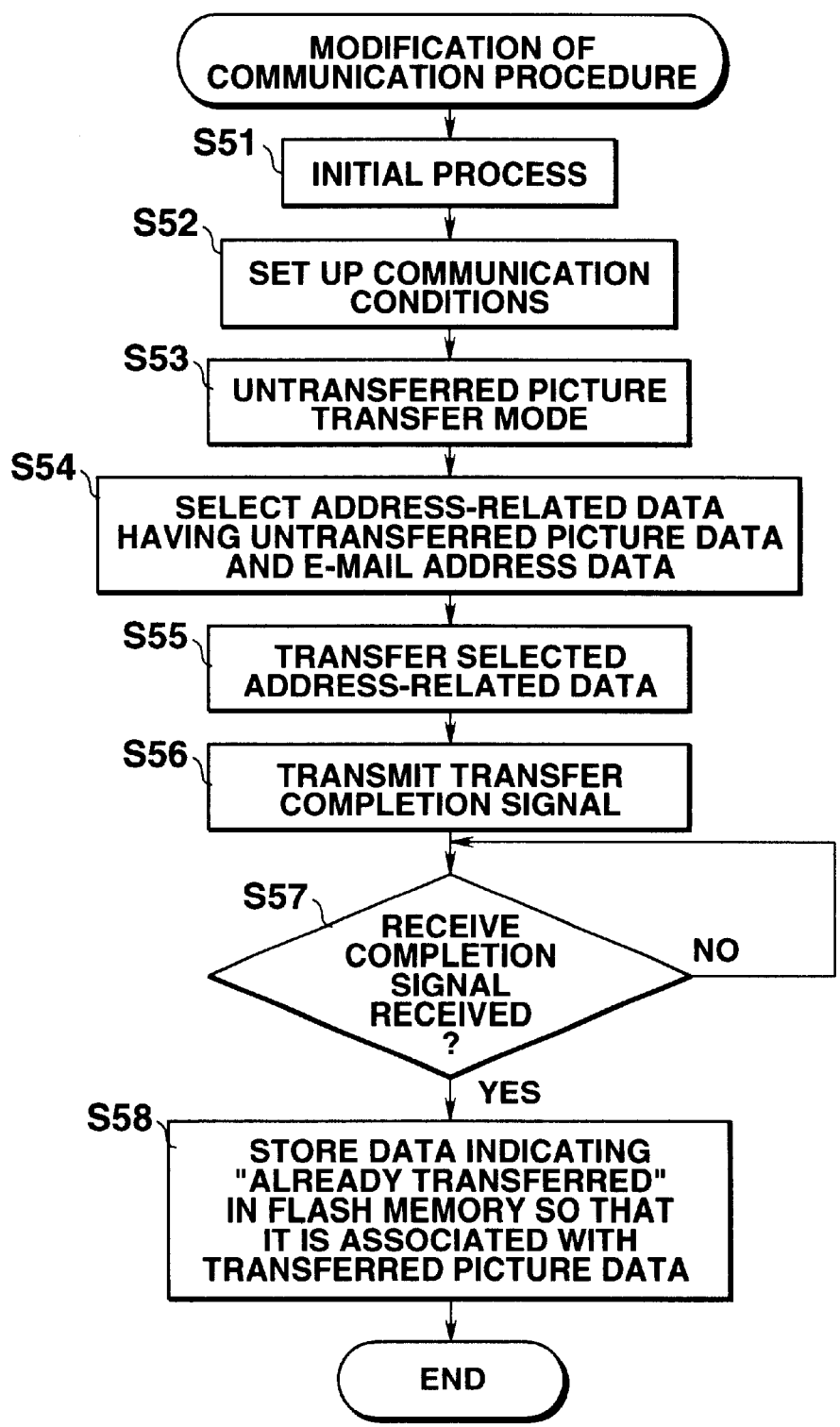
FIG. 16 shows a modification of the flowchart for communication procedure of FIG. 10.

In the modification of the communication procedure of FIG. 16, address-related data having untransferred picture data and E-mail address data is selected in step S54. If, as an example, address-related data already transferred is erased automatically, the need of deciding whether or not picture data is untransferred is eliminated, allowing all the address-related data having E-mail address data to be selected.

In the above-described embodiment, the personal computer 2 is arranged to transmit picture data transferred from the digital camera 1 to a destination terminal. Alternatively, the digital camera itself may be arranged to transmit picture data to a destination terminal without using the personal computer 2.

This arrangement will be described below.

Figure 17:
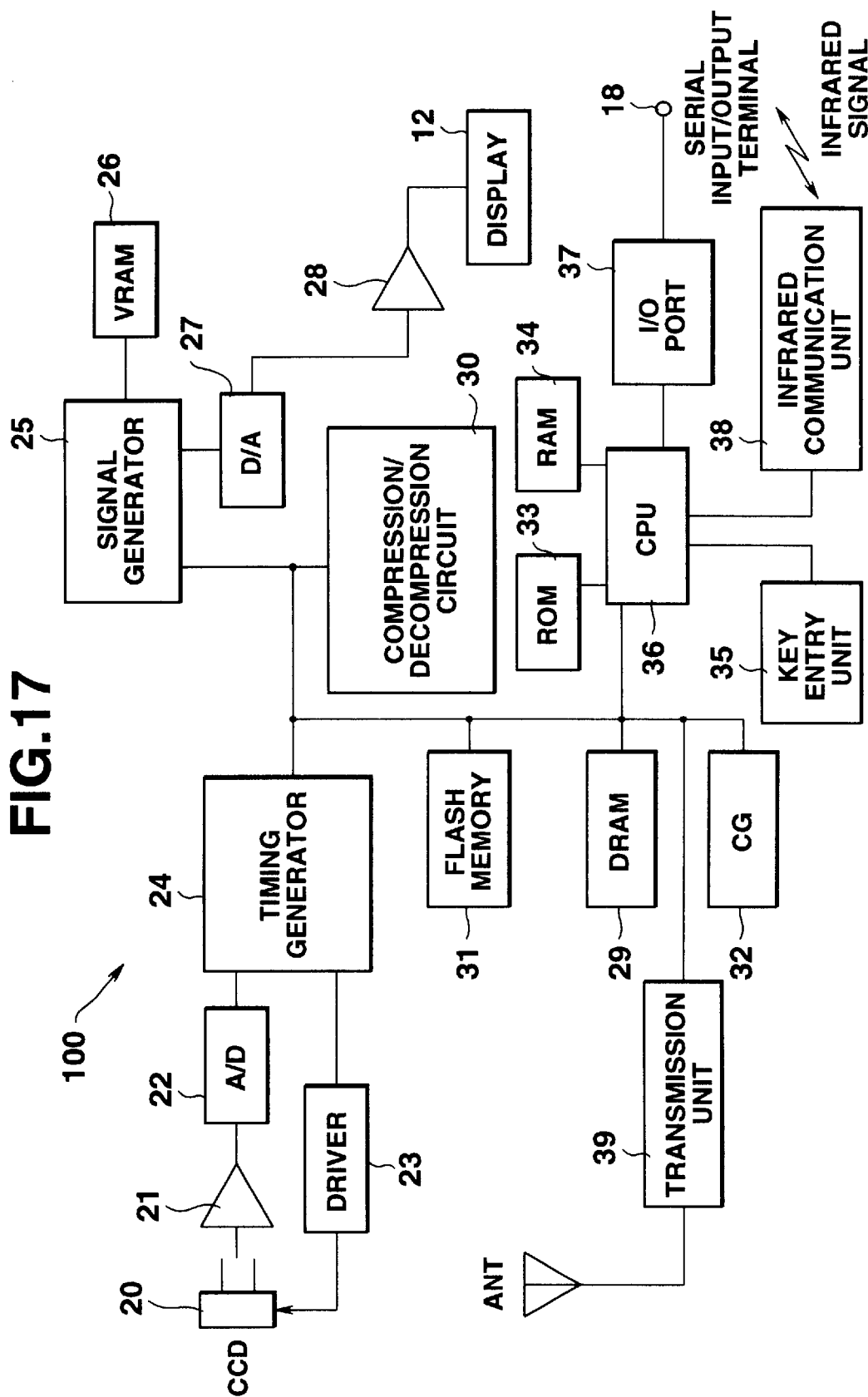
FIG. 17 shows, in block form, a circuit arrangement of a digital camera to which the present invention is applied.

FIG. 17 shows a circuit arrangement of a digital camera 100 having a telephone communication function.

A transmission unit 39, which is adapted to transmit E-mail to a destination terminal over a communication line and a computer network, comprises a frequency converter and a modem. The frequency converter provides frequency conversion by mixing a modulated signal from the modem to be described later and a local oscillator signal of a predetermined frequency output from a PLL synthesizer. The frequency-converted signal is radiated from an antenna ANT. In the modem, data from the DRAM 29 or the flash memory 31 is modulated and then output to the frequency converter.

Figure 2:
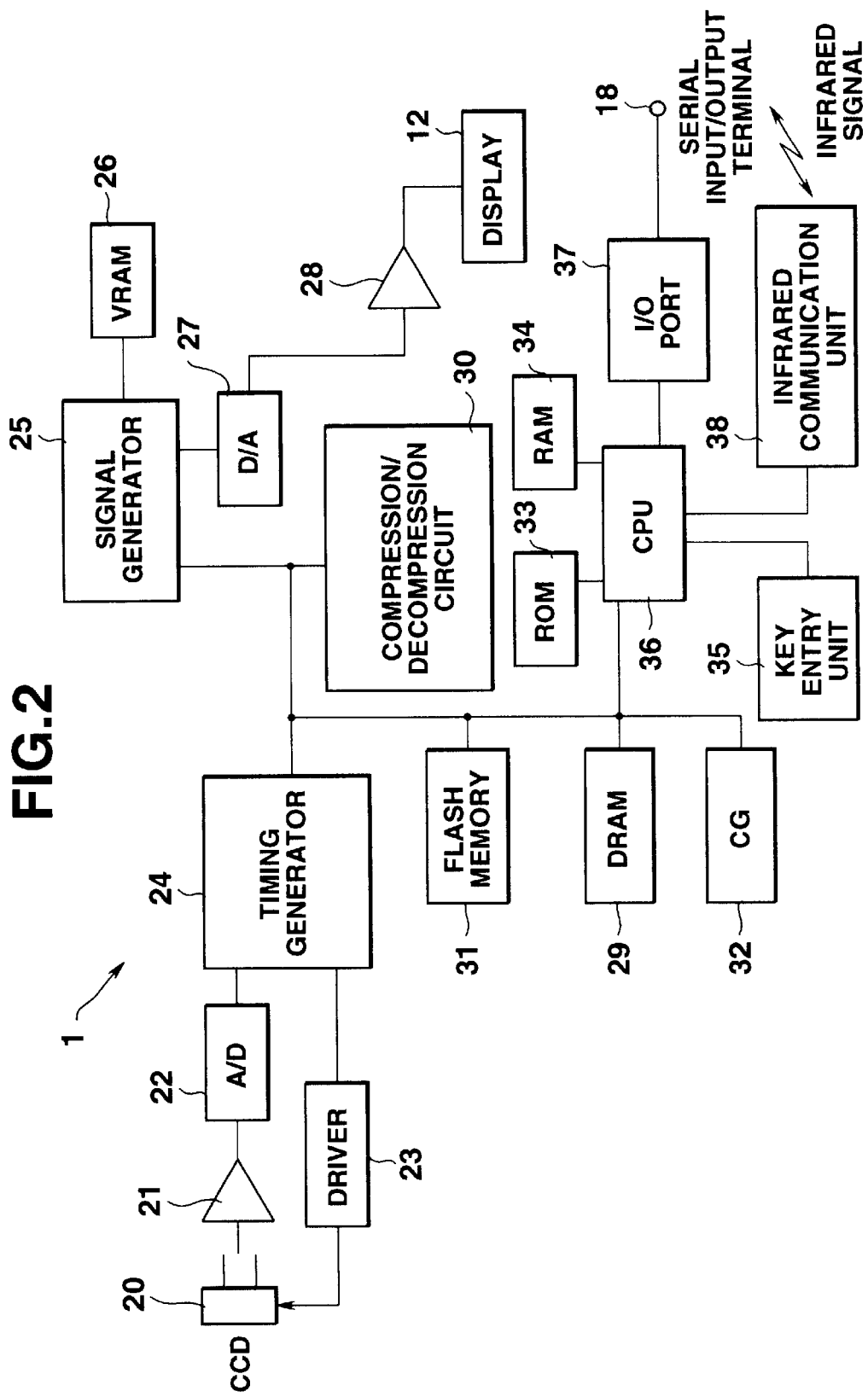
FIG. 2 is a block diagram of circuitry built into the digital camera of FIG. 1.

The digital camera of FIG. 17 is the same as that of FIG. 2 except for the transmission unit 39 and the antenna ANT and hence its detailed description is omitted.

In the digital camera 100 shown in FIG. 17, the telephone communication function (the transmission unit 39 and the antenna ANT) are built into the camera body. As an alternative, for example, the input/output terminal of a cellular phone may be connected to the serial input/output terminal 18.

The foregoing is the arrangement of the digital camera 100.

Next, the mail transmission procedure carried out by the CPU 36 in the digital camera 100 will be described with reference to a flowchart shown in FIG. 18.

When instructed by the key entry unit 35 to perform the mail transmission procedure, the CPU 36 calls a mail transmitting program from the ROM 33 into execution.

First, the CPU 36 performs an initial process such as initialization (step S61). After that, the CPU goes into the transmit picture specification mode (step S62). In this transmit picture specification mode, the CPU 36 first performs the processes identical to those in steps S2 to S6 in the previously described data entry procedure described in conjunction with FIGS. 8 and 9 (steps S63 to S67), whereby two or more pictures stored in the flash memory 31 are displayed in sequence on the display unit 12 by pressing the plus key 17a or the minus key 17b and a picture to be sent to a destination terminal is specified by pressing the shutter key 15.

In this case, picture data displayed on the display unit by operating the plus key or the minus key is one having at least E-mail address data as its associated additional data. The additional data is displayed simultaneously with the corresponding picture data.

Next, the CPU 36 makes a decision of whether there is more picture data to be transmitted on the basis of a key operation (step S68). When the effect key 16 is pressed to indicate that there is more picture data, the CPU returns to step S64 to continue the process of specifying picture data to be sent.

When the shutter key 15 is pressed and it is therefore decided that there is no more picture data to be sent, the CPU 36 drives the transmission unit 39 and the antenna ANT and dials to connect the digital camera 100 to the computer network through a communication line (step S69). The CPU then sends one or more items of picture data specified to be transmitted and their associated additional data (title data, date data, and memo data) read from the flash memory 31 to their respective destination terminals addressed by their respective associated E-mail address data (step S70).

After that, the CPU disconnects the line between the digital camera and the computer network (step S71), terminating the mail transmission procedure.

The foregoing is the mail transmission procedure carried out by the CPU 36 in the digital camera 100.

Such an arrangement of the digital camera 100 allows the user to input into picture data which was shot together with a person with whom the user got acquainted during his or her journey the person's E-mail address data and transmit the picture data to the person's terminal on the spot where the picture was shot.

Figure 18:
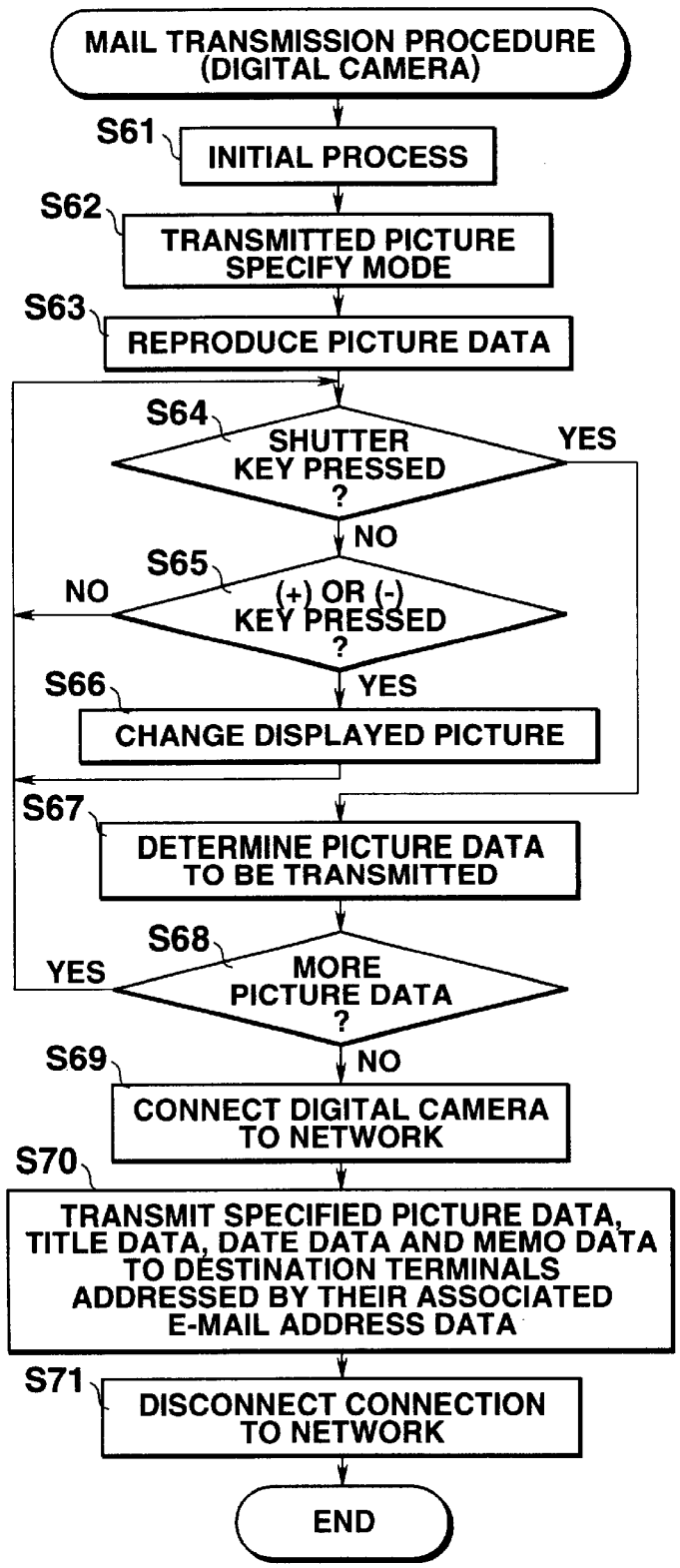
FIG. 18 is a flowchart for mail transmission by the CPU of FIG. 17.
Figure 19:
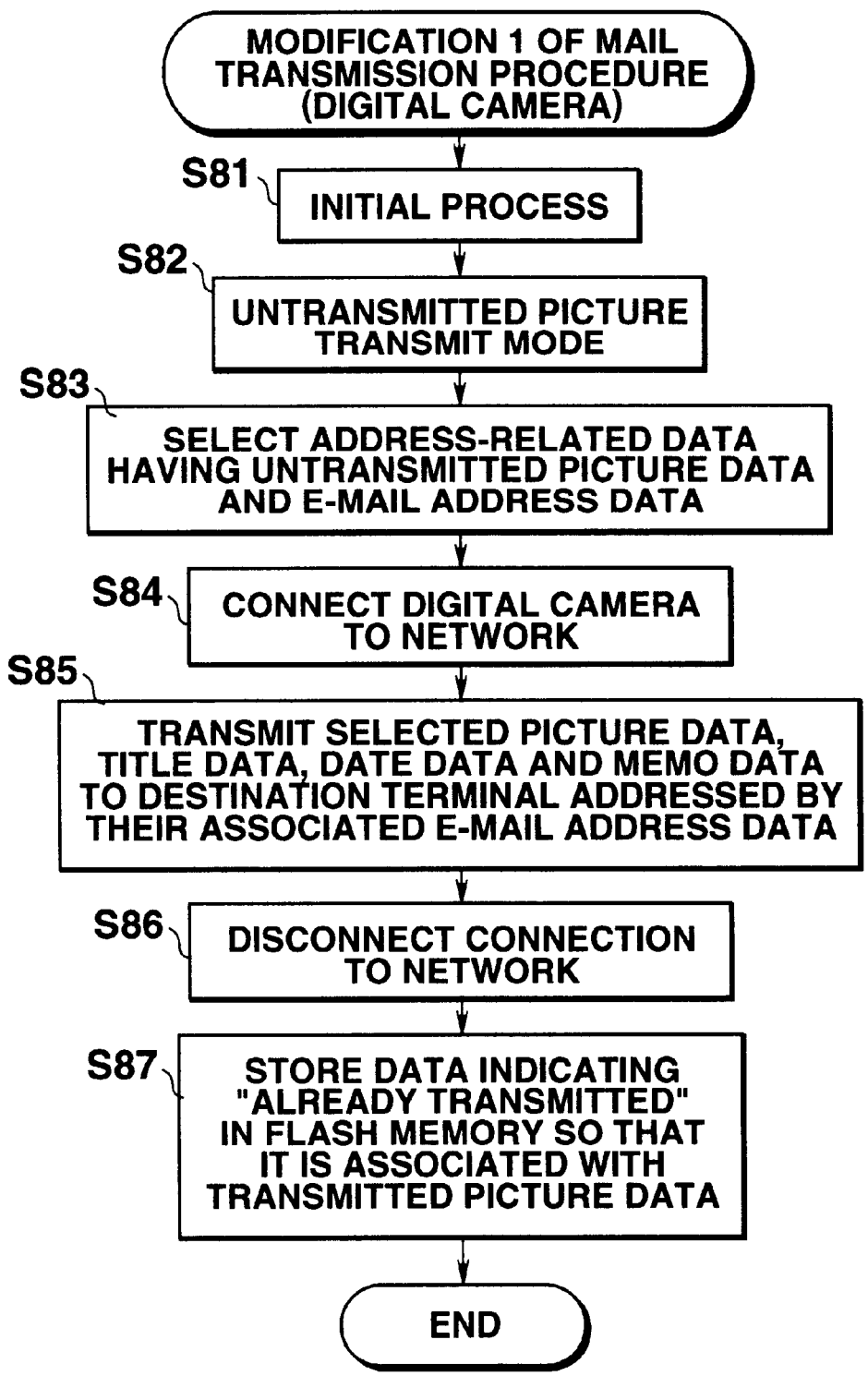
FIG. 19 shows a first modification of the flowchart for mail transmission shown in FIG. 18.
Figure 20:
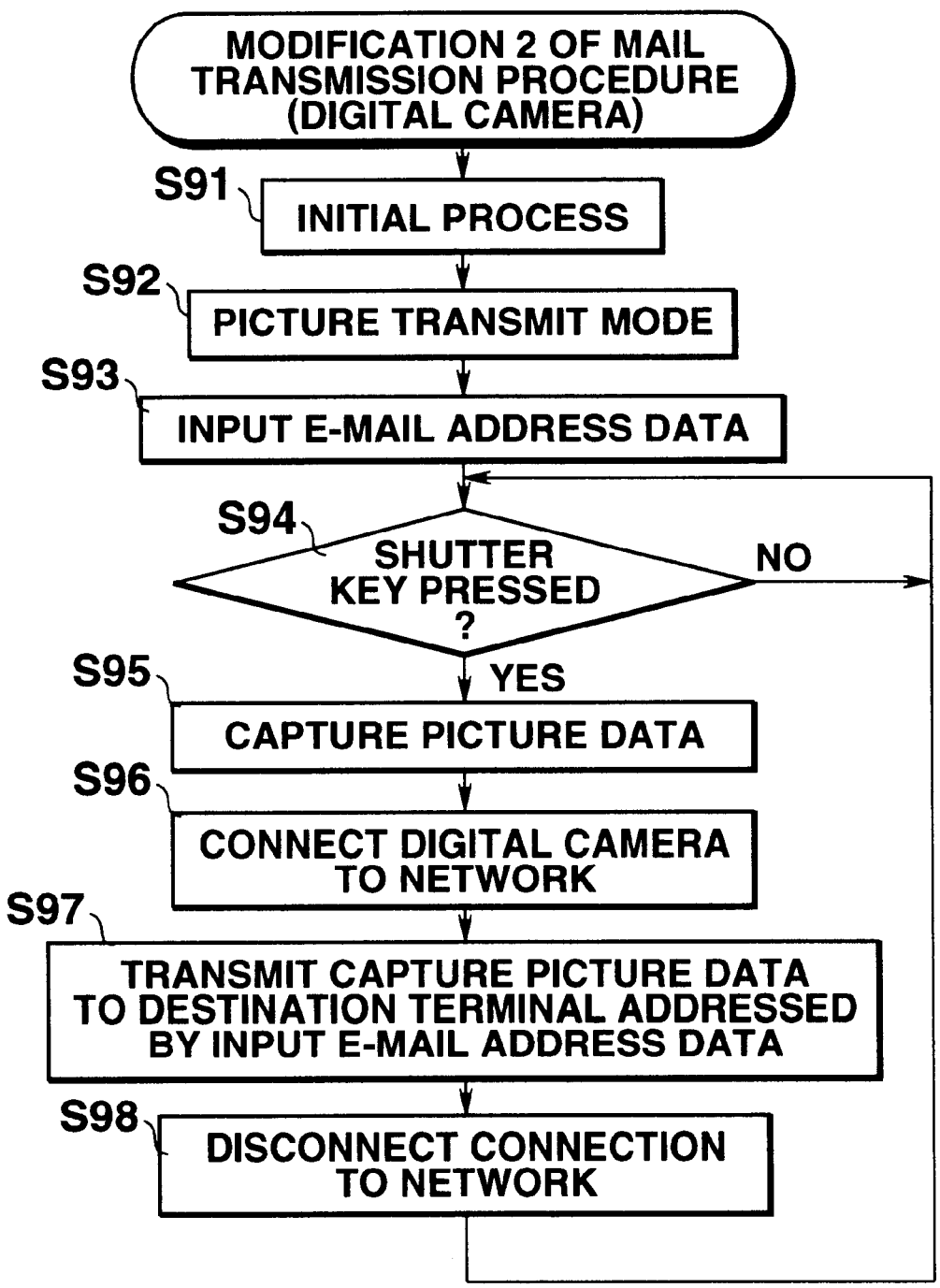
FIG. 20 shows a second modification of the flowchart for mail transmission shown in FIG. 18.

The mail transmission procedure of FIG. 18 may be modified as shown in FIG. 19 or FIG. 20. These modifications 1 and 2 will be described below.

Reference will first be made to FIG. 19 to describe the modification 1 of the mail transmission procedure.

In this modification, when instructed by the key input unit 35 to go to the mail transmission procedure, the CPU 36 calls a mail transmission-related program from the ROM 33 into execution.

First, the CPU 36 performs an initial process such as initialization (step S81).

After that, the CPU enters the untransmitted picture transmission mode (step S82).

In the untransmitted picture transmission mode, the CPU 36 first retrieves address-related data having untransmitted picture data and E-mail address data from the flash memory 31 (step S83). A decision of whether or not picture data is untransmitted is made on the basis of whether information indicating "already transmitted" to be described later is stored associated with the picture data in the flash memory 31.

After that, the CPU 36 drives the transmission unit 39 and the antenna ANT and dials to connect the digital camera 100 to a computer network through a communication line (step S84). The CPU then sends one or more items of picture data and their associated additional data retrieved from the flash memory 31 to their respective destination terminals in accordance with their respective associated E-mail address data (step S85).

The CPU disconnects the line between the computer network and the digital camera 100 (step S86) and then stores data indicating "already transmitted" into the flash memory 31 so that it is associated with the picture data transmitted in step S85 (step S87), thereby terminating the mail transmission procedure.

In the modification of the communication procedure of FIG. 19, address-related data having untransferred picture data and E-mail address data is selected in step S83. If, as an example, address-related data already transmitted is erased automatically, the need of deciding whether or not picture data is untransmitted is eliminated, allowing all the address-related data having E-mail address data to be selected.

Such a configuration, unlike the mail transmission procedure described in conjunction with FIG. 18, eliminates the need of selecting and specifying picture data to be sent.

First, the CPU 36 performs an initial process such as initialization (step S91).

After that, the CPU enters the picture transmission mode (step S92).

In this mode, the CPU 36 temporarily stores E-mail address data input by the user through the key entry unit 35 into a predetermined area of the RAM 34 (step S93).

The CPU 36 then makes a decision of whether or not the shutter key 15 was operated to shoot a picture (step S94). When the shutter key was operated, picture data captured by the CCD 20 is temporarily stored in the DRAM 29 (step S95).

Subsequently, the CPU drives the transmission unit 39 and the antenna ANT and dials to connect the digital camera to a computer network through a communication line (step S96) and reads the pictured data captured in step S95 from the DRAM 29 and sends it to the destination terminal addressed by the E-mail address data stored temporarily in the RAM 34 (step S97).

After that, the CPU disconnects the line between the computer network and the digital camera (step S98) and then returns to step S94 to continue shooting.

The foregoing is the mail transmission procedure carried out by the CPU 36 in the digital camera 100.

In the modification 2 of the mail transmission procedure of FIG. 20, in steps S94 and S95, only pictures shot are transmitted to destination terminals addressed by E-mail address data input in step S93. As an alternative, in step S93, title data and memo data may be inputted in addition to E-mail address data and, in step S97, the title data and memo data may be sent together with the picture data.

Although the preferred embodiments of the present invention have been disclosed and described, the present invention may be practiced or embodied in still other ways without departing the scope and spirit thereof.

In the above-described embodiments, the destination address setting function of the present invention is applied to data transmission by E-mail. However, the present invention may be applied not only to data transmission by E-mail but also to data transmission by other wire or wireless communications.

In addition, in the above-described embodiments, the present invention was described as using a digital still camera that shoots still pictures as a picture entry device. However, the present invention may be applied to a picture entry device, such as a video camera, that shoots moving pictures.

Figure 21A:
FIGS. 21A, 21B, 21C and 21D show forms of data communications between the digital camera of FIG. 1 and the personal computer of FIG. 5.

Further, in the above-described embodiments, the present invention was described as transferring data from the digital camera to the personal computer through infrared communications as shown in FIG. 21A. However, the present invention can likewise be applied to such data communications forms as shown in FIGS. 21B to 21D.

FIGS. 21A to 21D shows the forms of data communications between the digital camera 1 and the personal computer 2.

Figure 21B:
Figure 21C:
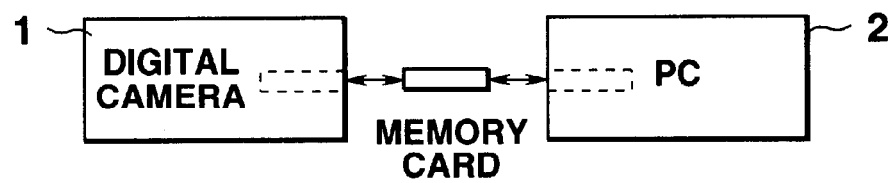
Figure 21D:
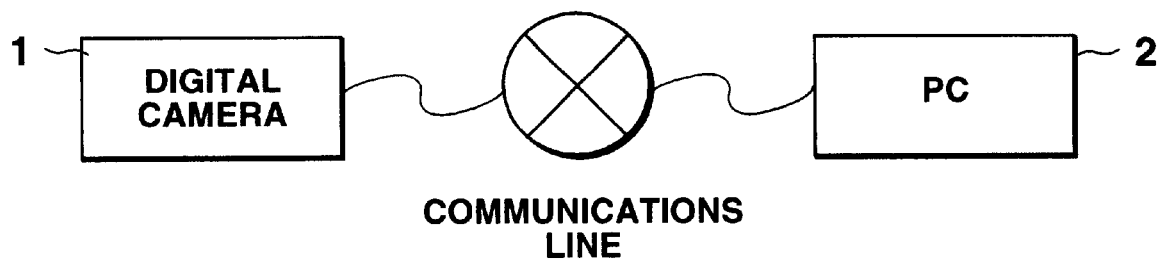

FIG. 21A shows data communications using infrared communications, FIG. 21B shows data communications using a communication cable (for example, RS-232C type), FIG. 21C shows data communications using a memory card, and FIG. 21D shows data communications using a communication line.

In the system of FIG. 21B, each of the digital camera and the personal computer is equipped with an I/O port (in the above-described embodiment, the I/O port 37 and the I/O port 43) and a communication cable is connected between the digital camera and the personal camera. Data, such as picture data, additional data, and control data, are communicated over the communication cable between the digital camera and the personal computer in the serial signal form, realizing data transfer from the digital camera to the personal computer.

In the system of FIG. 21C, each of the digital camera and the personal computer is equipped with a card slot into which a memory card is plugged, and data communications are made between the digital camera and the personal computer through the use of the memory card. In this system, the digital camera first stores picture data and its additional data into the memory card, and then the memory card is plugged into the card slot of the personal computer, thus allowing data to be transferred from the digital camera to the personal computer. A storage medium used for data transfer is not limited to a memory card, but may be a semiconductor memory, magnetic storage medium, optical storage medium, or the like.

In the system of FIG. 21D, each of the digital camera and the personal computer is equipped with a data communication function adapted for a communication line, such as a public network, LAN, or the like, which is connected between the digital camera and the personal computer. Data, such as picture data, additional data, and control data, are communicated over the communication line between the digital camera and the personal computer in the signal form that conforms to the communication line, allowing data transfer from the digital camera to the personal computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A portable electronic camera comprising:
    picture capturing means for capturing a picture of a subject;
    storage means for storing a plurality of picture data items obtained by the picture capturing means;
    first selection means for selecting a desired picture data item from the picture data items stored in the storage means;
    input means for inputting a destination address data item indicative of a transmission destination;
    storage control means for causing the storage means to store the input destination address data item in association with the picture data item selected by the first selection means;
    second selection means for selecting at least one picture data item from the picture data items stored in the storage means;
    output means for externally outputting the picture data item selected by the second selection means; and
    output control means for, when the output means externally outputs the selected picture data item, externally outputting the destination address data item stored in the storage means in association with the selected picture data item;
    wherein the storage means stores different destination address data items, input by the input means, in association with the respective picture data items.

2. The portable electronic camera according to claim 1, wherein the output means comprises means for transferring the picture data items to external equipment.

3. The portable electronic camera according to claim 1, wherein the output control means comprises means for causing the picture data items to be transmitted to respective one or more destination terminals based on the destination address data items.

4. The portable electronic camera according to claim 1, wherein the second selection means selects a desired picture data item from the picture data items stored in the storage means.

5. The portable electronic camera according to claim 1, wherein the second selection means includes means for selecting a desired destination address data item from among the plurality of destination address data items stored in the storage means, and the second selection means selects a picture data item stored in the storage means in association with the destination address data item selected by the means.

6. The portable electronic camera according to claim 1, wherein the second selection means selects a picture data item which is not yet externally output by the output means from among the picture data items stored in the storage means.

7. The portable electronic camera according to claim 1, wherein:
    the input means includes means for inputting title data and/or memo data,
    the storage control means causes the storage means to store the picture data items, the destination address data items, and the title data and/or the memo data inputted by the input means in association with the picture data item selected by the first selection means; and
    the output control means externally outputs, when the output means externally outputs the picture data item, the title data and/or the memo data stored in the storage means in association with the picture data item.

8. The portable electronic camera according to claim 1, wherein the storage means comprises a memory card which is adapted to be inserted in and removed from a body of the portable electronic camera.

9. The portable electronic camera according to claim 1, wherein the destination address data items comprise E-mail addresses.

10. The portable electronic camera according to claim 1, further comprising display means for simultaneously displaying the picture data items and the destination address data items respectively associated therewith.

11. The portable electronic camera according to claim 1, further comprising mode selection means for selecting one of an address input mode for inputting destination address data, and a picture output mode for outputting picture data, and wherein if the mode selection means selects the address input mode, input of destination address data by the input means is allowed, and if the mode selection means selects the picture output mode, external output of picture data by the output means is allowed.

12. The portable electronic camera according to claim 1, further comprising means for storing a character data storage table showing a plurality of characters, and wherein the input means selects arbitrary characters one by one from the character data storage table, thereby inputting destination address data.

13. The portable electronic camera according to claim 1, wherein the input means receives destination address data output from an external device.

14. The portable electronic camera according to claim 1, wherein the input means executes character recognition processing on the picture data items obtained by the picture capturing means, and inputs resultant character data as destination address data.

15. The portable electronic camera according to claim 1, wherein the input means executes character recognition processing on character data input by handwriting on a touch panel, and inputs resultant character data as destination address data.

16. The portable electronic camera according to claim 1, wherein the input means includes means for inputting a plurality of destination address data items, and the storage control means includes means for storing in the storage means a plurality of destination address data items input by the input means in association with the picture data item selected by the first selection means.

17. The pottable electronic camera according to claim 1, wherein the first selection means includes means for selecting a plurality of desired picture data items from the picture data items stored in the storage means, and the storage control means includes means for storing in the storage means destination address data input by the input means in association with a plurality of picture data items selected by the first selection means.

18. The portable electronic camera according to claim 1, wherein the storage control means includes means for replacing, with destination address data input by the input means, destination address data stored in the storage means in association with the picture data selected by the first selection means.

19. The portable electronic camera according to claim 1, further comprising display control means for controlling a display to display a plurality of the picture data items stored in the storage means, and wherein the first selection means selects the desired picture data item from the displayed picture data items.

20. The portable electronic camera according to claim 19, wherein the display control means includes means for controlling the display to display destination address data stored in the storage means in association with the picture data items.

21. The portable electronic camera according to claim 1, further comprising display control means for controlling a display to display a plurality of the picture data items stored in the storage means, and wherein the second selection means selects the at least one picture data item from the displayed picture data items.

22. The portable electronic camera according to claim 21, wherein the display control means includes means for controlling the display to display destination address data stored in the storage means in association with the picture data items.

23. An electronic camera comprising:

picture capturing means for capturing a picture of a subject;

input means for inputting a destination address data of a location to which picture data captured by the picture capturing means is to be transmitted;

storage means for storing the picture data captured by the picture capturing means and the destination address data input by the input means in association with each other;

output means for outputting to external equipment the picture data and the destination address data associated therewith stored in the storage means;

means for, when the picture data and the destination address data associated therewith are transferred to the external equipment by the output means, setting whether or not to transfer the destination address data together with the picture data.

24. The portable electronic camera according to claim 23, wherein:

the storage means stores picture data items captured by the picture capturing means, and destination address data items input by the input means, each of the picture data items being stored in association with a corresponding one of the destination address data items;

the portable electronic camera further comprises selection means for selecting a desired picture data item from the picture data items stored in the storage means; and the output means externally outputs the selected picture data item and a corresponding destination address data item.

25. The portable electronic camera according to claim 23, wherein:

the input means includes means for inputting title data and/or memo data corresponding to the picture data, the storage means stores, in association with each other, the picture data, the destination address data, and the title data and/or the memo data input by the input means;

the output means externally outputs the picture data, the destination address data, and the title data and/or the memo data stored in the storage means in association with each other; and the setting means determines whether or not the destination address data and the title data and/or the memo data should be output to an external device together with the picture data, when the output means outputs the picture data, the destination address data and the title data and/or memo data.

26. An electronic device comprising:

receiving means for receiving picture data and destination address data of a location to which the picture data is to be transmitted;

storage means for storing the picture data and the destination address data received by the receiving means in association with each other;

transmitting means for transmitting the stored picture data to a destination terminal based on the destination address data stored in the storing means; and selecting means for selecting, from the stored picture data, picture data that has not been transmitted by the transmitting means, wherein the transmitting means transmits the picture data selected by the selecting means to the destination terminal based on the destination address data associated with the picture data selected by the selecting means.

27. The electronic device according to claim 26, further comprising detecting means for detecting completion of reception of the picture data and the corresponding destination address data by the receiving means, and wherein when the detecting means detects the completion of the reception, the transmitting means transmits the picture data selected by the selecting means based on destination address data corresponding to the selected picture data.

28. The electronic device according to claim 26, wherein:

the receiving means receives title data and/or memo data corresponding to the picture data, together with the picture data and the corresponding destination address data;

the storage means stores the picture data, the corresponding destination address data and the title data and/or the memo data received by the receiving means; and the transmitting means transmits, to the destination terminal, the picture data selected by the selecting means, and the title data and/or the memo data stored in the storage means in association with the selected picture data, based on the destination address data corresponding to the selected picture data.

29. A transmission system comprising a portable electronic camera and an electronic device, wherein the portable electronic camera comprises:

picture capturing means for capturing a picture of a subject;

storage means for storing a plurality of picture data items obtained by the picture capturing means;

first selection means for selecting a desired picture data item from the picture data items stored in the storage means;

input means for inputting a destination address data item indicative of a transmission destination;

storage control means for causing the storage means to store the input destination address data item in association with the picture data item selected by the first selection means;

second selection means for selecting at least one picture data item from the picture data items stored in the storage means;

output means for externally outputting the picture data item selected by the second selection means; and output control means for, when the output means externally outputs the selected picture data item, externally outputting the destination address data item stored in the storage means in association with the selected picture data item;

wherein the storage means stores different destination address data items, input by the input means, in association with the respective picture data items, and wherein the electronic device comprises:

receiving means for receiving the output picture data item and the output corresponding destination address data item;

second storage means for storing combinations of the picture data items and the corresponding destination address data items received by the receiving means; and transmitting means for transmitting to a destination terminal, based on at least one destination address data item, a picture data item stored in the second storage means in association with the at least one destination data address item.

30. The transmission system according to claim 29, wherein the portable electronic camera and the electronic device are adapted to wirelessly communicate with each other.

31. The transmission system according to claim 30, wherein the electronic camera and the electronic device are adapted to communicate with each other via infrared signals.

32. A method of controlling a portable electronic camera comprising:

capturing a picture of a subject;

storing in a memory a plurality of picture data items corresponding to picked up images;

selecting a desired picture data item from the stored picture data items;

inputting a destination address data item;

storing in the memory the input destination address data item in association with the selected picture data item;

selecting at least one picture data item from the stored picture data items;

externally outputting the selected picture data item; and externally outputting the destination address data item stored in the memory in association with the selected picture data item, when externally outputting the selected picture data item.

33. A portable electronic camera comprising:

a picture capturing section for capturing a picture of a subject;

a memory storing a plurality of picture data items obtained by the picture capturing section;

a first selection section for selecting a desired picture data item from the picture data items stored in the memory;

an input section for inputting a destination address data item indicative of a transmission destination;

a storage control section for causing the memory to store the input destination address data item in association with the picture data item selected by the first selection section;

a second selection section for selecting at least one picture data item from the picture data items stored in the memory;

an output section for externally outputting the picture data item selected by the second selection section; and an output control section for, when the output section externally outputs the selected picture data item, externally outputting the destination address data item stored in the memory in association with the selected picture data item;

wherein the memory stores different destination address data items, input by the input section, in association with the respective picture data items.

34. An electronic camera composing:

a picture capturing unit for capturing a picture of a subject;

an input unit for inputting destination address data of a location to which picture data captured by the picture capturing unit is to be transmitted;

a memory for storing the picture data captured by the picture capturing unit and the destination address data input by the input unit in association with each other;

an output unit for outputting to external equipment the picture data and the destination address data associated therewith stored in the memory; and a setting unit for, when the picture data and the destination address data associated therewith are transferred to the external equipment by the output unit, setting whether or not to transfer the destination address data together with the picture data.

35. An electronic device comprising:

a receiving unit for receiving picture data and destination address data of a location to which the picture data is to be transmitted;

a memory for storing the picture data and the destination address data received by the receiving unit in association with each other;

a transmitting unit for transmitting the stored picture data to a destination terminal based on the destination address data stored in the memory; and a selecting unit for selecting, from the stored picture data, picture data that has not been transmitted by the transmitting unit;

wherein the transmitting unit transmits the picture data selected by the selecting unit to the destination terminal based on the destination address data associated with the picture data selected by the selecting unit.

36. A method of controlling an electronic camera comprising:

capturing a picture of a subject;

inputting destination address data;

storing the captured picture data and the inputted destination address data in association with each other in a memory;

externally outputting the picture data and the destination address data associated therewith stored in the memory; and setting, when the picture data and the destination address data associated therewith are transferred to external equipment, whether or not to transfer the destination address data together with the picture data.

37. A method of controlling an electronic device comprising:

receiving picture data and destination address data associated therewith;

storing the received picture data and destination address data in a memory;

selecting, from the picture data stored in the memory, picture data that has not been transmitted; and transmitting the selected picture data to a destination terminal based on destination address data associated with the selected picture data.

* * * * *